(12) United States Patent
Morita et al.

(10) Patent No.: US 10,756,589 B2
(45) Date of Patent: Aug. 25, 2020

(54) MOTOR COIL

(71) Applicant: IBIDEN CO., LTD., Ogaki (JP)

(72) Inventors: Haruhiko Morita, Ogaki (JP); Shinobu Kato, Ogaki (JP); Hitoshi Miwa, Ogaki (JP); Hisashi Kato, Ogaki (JP); Toshihiko Yokomaku, Ibi-gun (JP)

(73) Assignee: IBIDEN CO., LTD., Ogaki (JP)

( * ) Notice: Subject to any disclaimer, the term of this patent is extended or adjusted under 35 U.S.C. 154(b) by 167 days.

(21) Appl. No.: 16/124,246

(22) Filed: Sep. 7, 2018

(65) Prior Publication Data
US 2019/0074745 A1 Mar. 7, 2019

(30) Foreign Application Priority Data
Sep. 7, 2017 (JP) .................. 2017-171794

(51) Int. Cl.
*H02K 3/26* (2006.01)
*H01F 5/00* (2006.01)
*H02K 3/28* (2006.01)

(52) U.S. Cl.
CPC .............. *H02K 3/26* (2013.01); *H02K 3/28* (2013.01); *H02K 2203/03* (2013.01); *H02K 2213/03* (2013.01)

(58) Field of Classification Search
CPC .... H01F 17/00; H01F 17/001; H01F 17/0013; H01F 27/00; H01F 27/29; H01F 27/292; H02K 1/00; H02K 1/16; H02K 1/165; H02K 1/18; H02K 3/00; H02K 3/04; H02K 3/26; H02K 3/28; H02K 3/47; F04D 25/00; F04D 25/06; F04D 25/0606
See application file for complete search history.

(56) References Cited

U.S. PATENT DOCUMENTS

| | | | | |
|---|---|---|---|---|
| 4,804,574 A | * | 2/1989 | Osawa | H02K 3/26 428/209 |
| 5,510,663 A | * | 4/1996 | Van Loenen | H02K 3/26 310/179 |
| 2005/0285470 A1 | * | 12/2005 | Itoh | H02K 3/26 310/208 |
| 2006/0022543 A1 | * | 2/2006 | Takeuchi | H02K 3/26 310/179 |
| 2011/0057536 A1 | * | 3/2011 | Horng | H02K 3/26 310/208 |

FOREIGN PATENT DOCUMENTS

| | | | |
|---|---|---|---|
| JP | 60219952 | * | 11/1985 |
| JP | 9083104 | * | 3/1997 |
| JP | 2001-135548 A | | 5/2001 |
| JP | 2013084799 | * | 5/2013 |

* cited by examiner

*Primary Examiner* — Tran N Nguyen
(74) *Attorney, Agent, or Firm* — Oblon, McClelland, Maier & Neustadt, L.L.P.

(57) ABSTRACT

A motor coil includes a magnet structure, and a laminated coil substrate formed on the magnet structure and including coil substrates and adhesive layers alternately laminated. The coil substrates are formed by folding a printed wiring board including a resin substrate, a first conductor layer formed on a first surface of the resin substrate and forming coils, and a second conductor layer formed on a second surface on the opposite side with respect to the first surface and forming coils, and the adhesive layers include an adhesive layer including a magnetic sheet.

20 Claims, 8 Drawing Sheets

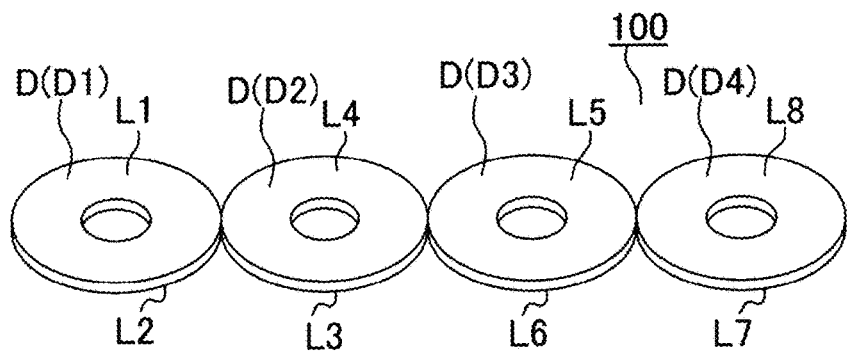
FIG. 3A
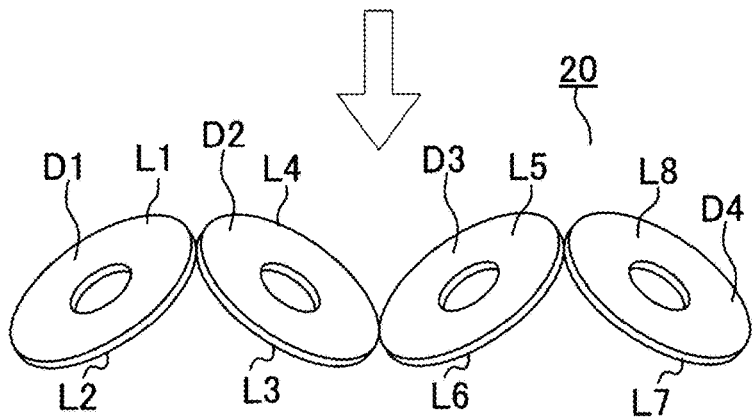
FIG. 3B
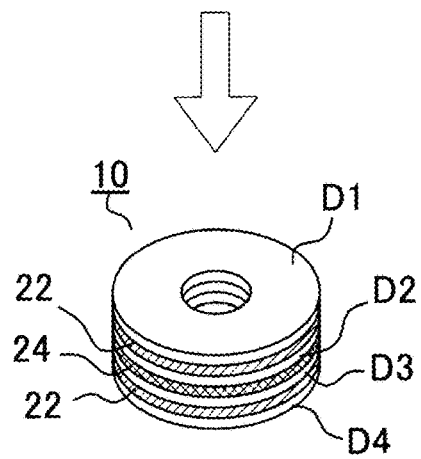
FIG. 3C
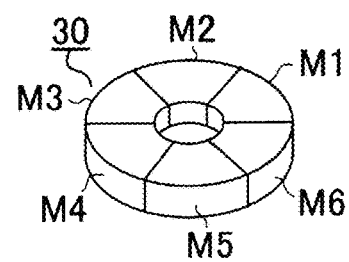
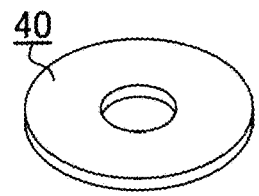

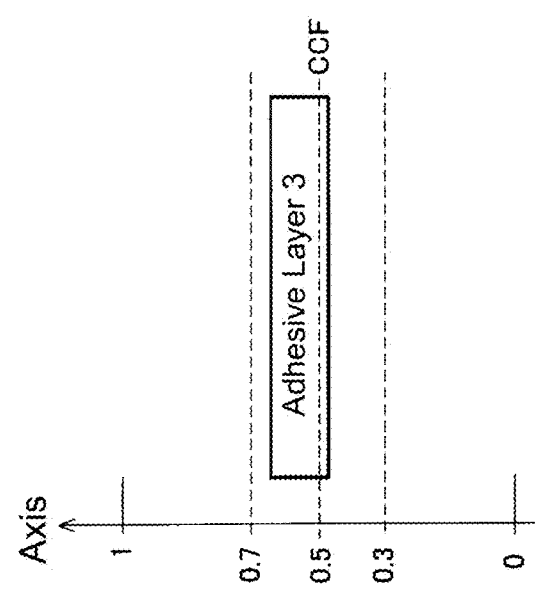

MOTOR COIL

CROSS-REFERENCE TO RELATED APPLICATIONS

The present application is based upon and claims the benefit of priority to Japanese Patent Application No. 2017-171794, filed Sep. 7, 2017, the entire contents of which are incorporated herein by reference.

BACKGROUND OF THE INVENTION

Field of the Invention

The present invention relates to a motor coil that includes a laminated coil substrate and a magnet.

Description of Background Art

Japanese Patent Laid-Open Publication No. 2001-135548 describes a laminated inductance. The entire contents of this publication are incorporated herein by reference.

SUMMARY OF THE INVENTION

According to one aspect of the present invention, a motor coil includes a magnet structure, and a laminated coil substrate formed on the magnet structure and including coil substrates and adhesive layers alternately laminated. The coil substrates are formed by folding a printed wiring board including a resin substrate, a first conductor layer formed on a first surface of the resin substrate and forming coils, and a second conductor layer formed on a second surface on the opposite side with respect to the first surface and forming coils, and the adhesive layers include an adhesive layer including a magnetic sheet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3A-3C are schematic diagrams illustrating manufacturing processes of a laminated coil substrate according to an embodiment of the present invention;

FIG. 6A-6C are schematic diagrams each illustrating a position of an adhesive layer;

DETAILED DESCRIPTION OF THE EMBODIMENTS

Figure 1:
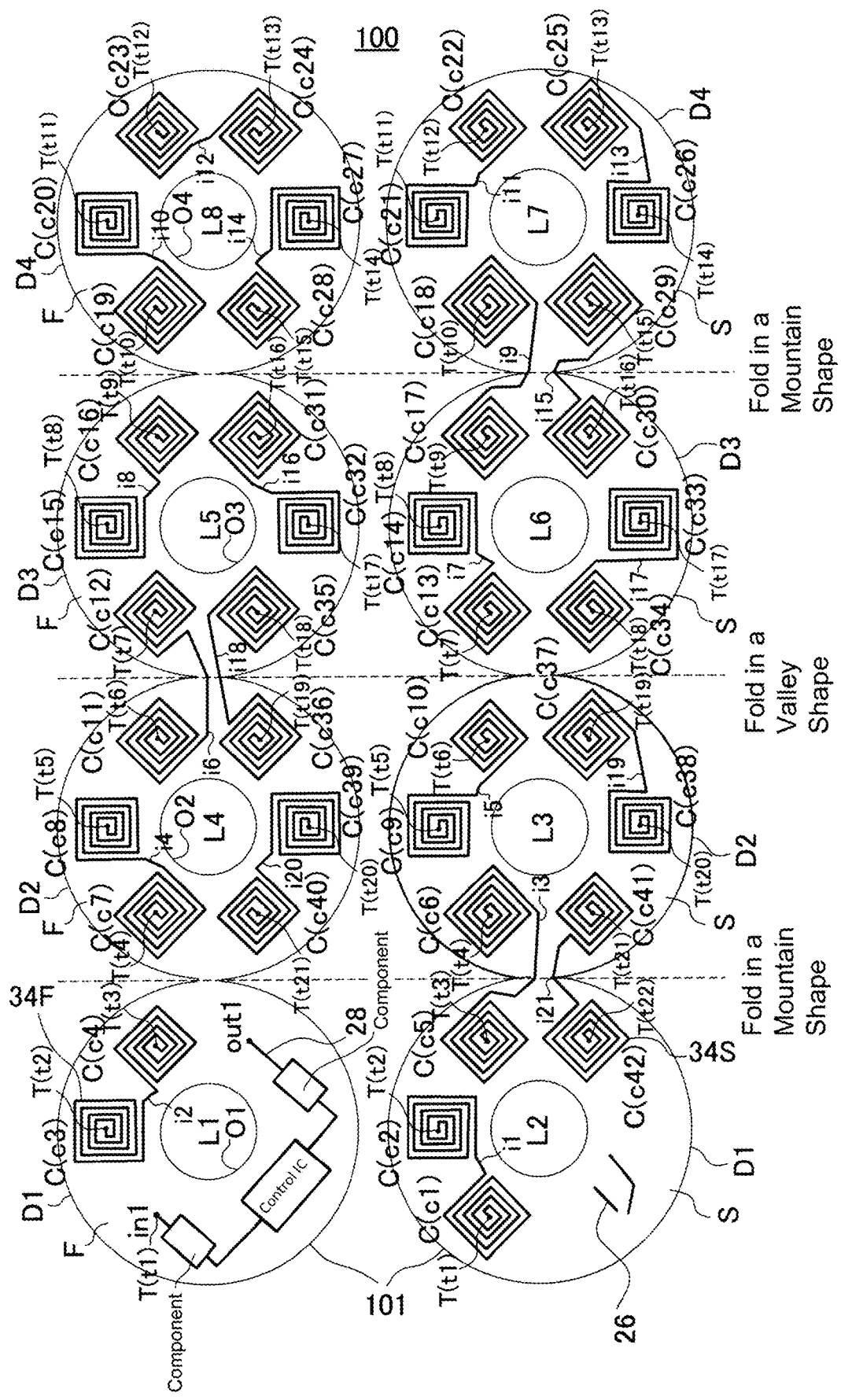
FIG. 1 illustrates a first surface and a second surface of a printed wiring board for forming a laminated coil substrate according to an embodiment of the present invention.

Embodiments will now be described with reference to the accompanying drawings, wherein like reference numerals designate corresponding or identical elements throughout the various drawings.

Figure 2:
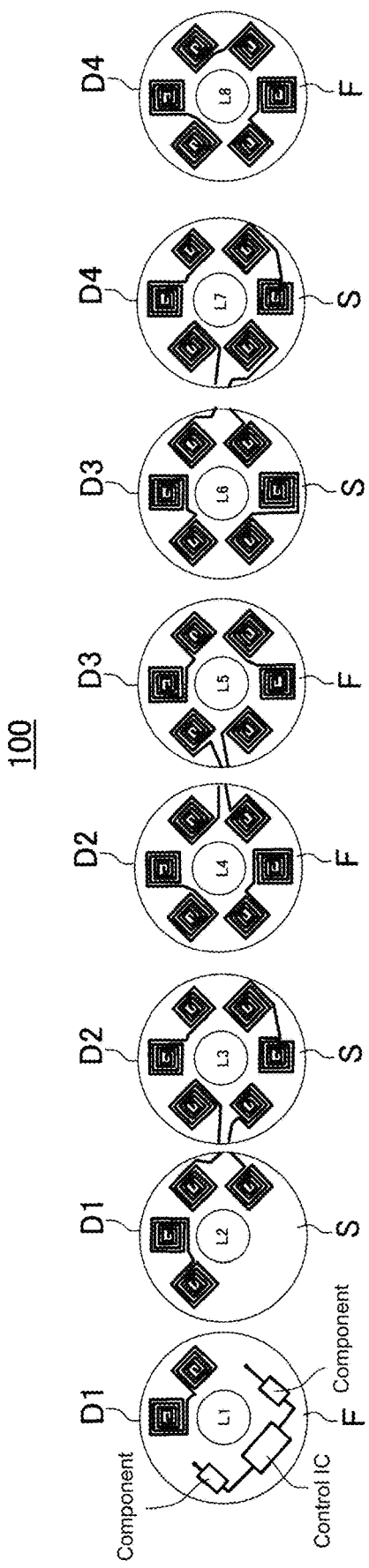
FIG. 2 is a developed view of the laminated coil substrate of the embodiment.

FIG. 3C illustrates a schematic diagram of a laminated coil substrate 10 of an embodiment. FIG. 1 illustrates a printed wiring board 100 for forming the laminated coil substrate 10 according to the embodiment. In FIG. 1, front and back sides of the printed wiring board 100 are depicted. FIG. 2 is a developed view of the laminated coil substrate 10 of the embodiment, and FIG. 3A-3C illustrate a method for manufacturing the laminated coil substrate 10 of the embodiment.

The printed wiring board 100 illustrated in FIG. 1 is formed by a resin substrate 101 having a first surface (front side surface) (F) and a second surface (back side surface) (S) that is on an opposite side with respect to the first surface (F), a first conductor layer (34F) formed on the first surface (F) of the resin substrate 101, and a second conductor layer (34S) formed on the second surface (S) of the resin substrate. The first conductor layer (34F) and the second conductor layer (34S) form coils. In FIG. 1, on the left side, the first surface (F) of the resin substrate 101 and the first conductor layer (34F) are depicted; and, on the right side, the second surface (S) of the resin substrate 101 and the second conductor layer (34S) are depicted.

As illustrated in the developed view of FIG. 2, a first surface (F) of a first coil substrate (D1) and a second surface (S) of the first coil substrate (D1) are connected to each other. The second surface (S) of the first coil substrate (D1) and a second surface (S) of a second coil substrate (D2) are connected to each other. The second surface (S) of the second coil substrate (D2) and a first surface (F) of the second coil substrate (D2) are connected to each other. The first surface (F) of the second coil substrate (D2) and a first surface (F) of a third coil substrate (D3) are connected to each other. The first surface (F) of the third coil substrate (D3) and a second surface (S) of the third coil substrate (D3) are connected to each other. The second surface (S) of the third coil substrate (D3) and a second surface (S) of a fourth coil substrate (D4) are connected to each other. The second surface (S) of the fourth coil substrate (D4) and a first surface (F) of the fourth coil substrate (D4) are connected to each other. In the laminated coil substrate 10, the first surfaces (F) of adjacent coil substrates oppose each other via an adhesive layer 22, and the second surfaces (S) of adjacent coil substrates oppose each other via an adhesive layer 22.

As illustrated in FIG. 3A, the printed wiring board 100 that forms the laminated coil substrate 10 is formed of the multiple coil substrates (D). The number of the coil substrates (D) that form the printed wiring board 100 is preferably an even number. As illustrated in FIG. 3A, adjacent coil substrates are connected to each other. The coil substrates for forming the laminated coil substrate are not individually separated from each other.

In FIG. 3A, the printed wiring board that forms the laminated coil substrate 10 is formed of the four coil substrates (D1, D2, D3, D4). The coil substrates (D1, D2, D3, D4) each have a shape of a disk. The four coil substrates (the first coil substrate (D1), the second coil substrate (D2), the third coil substrate (D3), and the fourth coil substrate (D4)) are connected.

As illustrated in FIG. 1, the coil substrates (D1, D2, D3, D4) each have the first surface (F) and the second surface (S) that is on an opposite side with respect to the first surface (F).

The coil substrates (D1, D2, D3, D4) each have coils (C) on the first surface (F). The number of the coils (C) formed on the first surface (F) of each of the coil substrates (D) is preferable 2 or more. The number of the coils (C) formed on the first surface (F) of each of the coil substrates (D) is preferable an even number.

The coil substrates (D1, D2, D3, D4) each have coils (C) on the second surface (S).

The number of the coils (C) formed on the second surface (S) of each of the coil substrates (D) is preferably 2 or more. The number of the coils (C) formed on the second surface (S) of each of the coil substrates (D) is preferable an even number. In some of the coil substrates (D), the number of the coils (C) on the first surface (F) and the number of the coils (C) on the second surface (S) are equal to each other.

The coils (C) on the first surface (F) and the coils (C) on the second surface (S) with the resin substrate 101 sandwiched therebetween can be connected to each other by through-hole conductors (T). The coils (C) on the first surface (F) and the coils (C) on the second surface (S) with the resin substrate 101 sandwiched therebetween are formed symmetrical with respect to the resin substrate 101. The coils (C) on the first surface (F) and the coils (C) on the second surface (S) with the resin substrate 101 sandwiched therebetween are formed plane-symmetrical. In this case, when the coils (C) on the first surface (F) are parallelly moved to the second surface (S), the coils (C) on the first surface (F) respectively overlap the coils (C) on the second surface (S). Further, a direction of a current flowing through the coils (C) on the first surface (F) and a direction of a current flowing through the coils (C) on the second surface (S) are the same.

The laminated coil substrate 10 preferably does not have through-hole conductors (T) connecting adjacent coil substrates to each other. One coil substrate and a coil substrate laminated directly on the one coil substrate are not connected to each other by a through-hole conductor (T). One coil substrate and a coil substrate laminated directly below the one coil substrate are not connected to each other by a through-hole conductor (T).

A laminated coil substrate 10 having a high inductance can be provided. For example, the first coil substrate (D1) and the second coil substrate (D2) are not connected to each other by a through-hole conductor (T). Similarly, the second coil substrate (D2) and the third coil substrate (D3) are not connected to each other by a through-hole conductor (T).

As illustrated in FIG. 1, the printed wiring board 100 for forming the laminated coil substrate 10 has connection wires (i). One coil substrate and another coil substrate connected to the one coil substrate are connected to each other by connection wires (i). Adjacent coil substrates are connected to each other by connection wires (i). One coil substrate and another coil substrate are adjacent to each other. The connection wires (i) each extend from one coil substrate to another coil substrate. Connection wires (i) are formed on the first surface (F) of one coil substrate and the first surface (F) of another coil substrate. Or, connection wires (i) are formed on the second surface (S) of one coil substrate and the second surface (S) of another coil substrate. Connection wires (i) formed on the first surface (F) are connection wires (if) on the first surface (F), and connection wires formed on the second surface (S) are connection wires (is) on the second surface (S). As illustrated in FIG. 1A, adjacent coil substrates are connected to each other by multiple connection wires. The number of the connection wires (i) connecting adjacent coil substrates to each other is preferably 2.

One coil substrate and another coil substrate laminated directly on the one coil substrate are connected to each other by connection wires (i). The number of the connection wires (i) connecting to each other one coil substrate and another coil substrate laminated directly on the one coil substrate is preferably 2.

One coil substrate and another coil substrate laminated directly below the one coil substrate are connected to each other by connection wires (i). The number of the connection wires (i) connecting to each other one coil substrate and another coil substrate laminated directly below the one coil substrate is preferably 2.

Adjacent coil substrates are preferably connected to each other only by connection wires (i). One coil substrate and another coil substrate laminated directly on the one coil substrate are preferably connected to each other only by connection wires (i). One coil substrate and another coil substrate laminated directly below the one coil substrate are preferably connected to each other only by connection wires (i).

FIG. 3A-3C are conceptual diagrams illustrating a method for manufacturing the laminated coil substrate 10 of the embodiment. As illustrated in FIG. 3A, the printed wiring board 100 having the multiple coil substrates (D1, D2, D3, D4) is prepared. The first surfaces (F) of the coil substrates forming the printed wiring board 100 are facing in the same direction. As illustrated in FIG. 3A, the first surfaces (F) of all of the coil substrates are facing in the same direction. The second surface (S) of the coil substrates forming the printed wiring board 100 are facing in the same direction. As illustrated in FIG. 3A, the second surfaces (S) of all of the coil substrates are facing in the same direction. In FIG. 3A, the first surface (F) of the first coil substrate (D1), the first surface (F) of the second coil substrate (D2), the first surface (F) of the third coil substrate (D3), and the first surface (F) of the fourth coil substrate (D4) are facing upward. The second surface (S) of the first coil substrate (D1), the second surface (S) of the second coil substrate (D2), the second surface (S) of the third coil substrate (D3), and the second surface (S) of the fourth coil substrate (D4) are facing downward.

Then, as illustrated in FIG. 3B, the printed wiring board 100 is folded such that adjacent coil substrates (D) overlap each other. Adjacent coil substrates (D) are folded between the adjacent coil substrates (D). In this case, the printing wiring board 100 is folded such that an adhesive layer 22 is sandwiched between each pair of adjacent coil substrates (D). By folding the printed wiring board 100 having the connection wires (i), the laminated coil substrate 10 is formed. Therefore, the laminated coil substrate 10 does not have to have through-hole conductors (T) for connecting adjacent coil substrates to each other.

By folding the printed wiring board 100, the laminated coil substrate 10 illustrated in FIG. 3C is formed. Coils (C) opposing each other via an adhesive layer 22 are connected to each other by connection wires (i). It is unnecessary to form a through-hole conductor (T) or a via conductor for connecting to each other coils (C) that oppose each other via an adhesive layer 22. It is unnecessary to form a through-hole conductor or a via conductor in an adhesive layer 22. It is unnecessary to form a through-hole conductor penetrating an adhesive layer 22. Adhesion strength via the adhesive layer 22 can be increased. Since the printed wiring board 100 is folded, the first surfaces (F) of the coil substrates are not facing in the same direction. The second surfaces (S) of the coil substrates are not facing in the same direction. In FIG. 3C, the first surface (F) of the first coil substrate (D1) is facing upward, the first surface (F) of the second coil substrate (D2) is facing downward, the first surface (F) of the third coil substrate (D3) is facing upward, and the first surface (F) of the fourth coil substrate (D4) is facing downward. The second surface (S) of the first coil substrate (D1) is facing downward, the second surface (S) of the second coil substrate (D2) is facing upward, the second surface (S) of the third coil substrate (D3) is facing downward, and the second surface (S) of the fourth coil substrate (D4) is facing upward. In the laminated coil substrate 10, the first surface (F) of one coil substrate and the first surface (F) of another coil substrate oppose each other via an adhesive layer 22, and the second surface (S) of one coil substrate and the second surface (S) of another coil substrate oppose each other via an adhesive layer 22.

In the example of FIG. 3B, the first coil substrate (D1) and the second coil substrate (D2) are folded between the first coil substrate (D1) and the second coil substrate (D2). The second coil substrate (D2) and the third coil substrate (D3) are folded between the second coil substrate (D2) and the third coil substrate (D3). The third coil substrate (D3) and the fourth coil substrate (D4) are folded between the third coil substrate (D3) and the fourth coil substrate (D4). As a result, the laminated coil substrate 10 illustrated in FIG. 3C is formed. In FIG. 3B, the first coil substrate (D1) and the second coil substrate (D2) are folded in a mountain shape, the second coil substrate (D2) and the third coil substrate (D3) are folded in a valley shape, and the third coil substrate (D3) and the fourth coil substrate (D4) are folded in a mountain shape.

The laminated coil substrate 10 of the embodiment is used, for example, as a coil of a fan motor of a computer. Adjacent coil substrates are bonded to each other by an adhesive layer 22. The coil substrates (D) are folded such that an adhesive layer 22 is sandwiched between each pair of adjacent coil substrates. At least one of the adhesive layers 22 is formed of a magnetic sheet 24. It is unnecessary to form a through-hole conductor or a via conductor in the magnetic sheet 24. For example, magnetic flux can be increased.

In the example of FIG. 3C, the adhesive layer 22 between the first coil substrate (D1) and the second coil substrate (D2) is not magnetic. The adhesive layer 22 between the third coil substrate (D3) and the fourth coil substrate (D4) is not magnetic. The adhesive layer 22 between the second coil substrate (D2) and the third coil substrate (D3) is magnetic. That is, the adhesive layer 22 positioned at substantially a center in a thickness direction of the laminated coil substrate is magnetic. A magnetic adhesive layer 22 is a magnetic sheet 24. A non-magnetic adhesive layer 22 is formed of, for example, epoxy. A magnetic sheet may contain magnetic particles. For example, the magnetic sheet 24 is formed by mixing magnetic particles in epoxy. Examples of the magnetic particles include iron (III) oxide particles, cobalt iron oxide particles, iron particles, magnetic alloy particles, ferrite particles, and the like.

As illustrated in FIG. 1, a first coil layer (L1) having coils (C) is formed on the first surface (F) of the first coil substrate (D1). In addition to the coils (C), the first coil layer (L1) has a wiring 28 including a pad for mounting an IC chip. A second coil layer (L2) having coils (C) is formed on the second surface (S) of the first coil substrate (D1). In addition to the coils (C), the second coil layer (L2) has a wiring 26. A fourth coil layer (L4) having coils (C) is formed on the first surface (F) of the second coil substrate (D2), and a third coil layer (L3) having coils (C) is formed on the second surface (S) of the second coil substrate (D2). A fifth coil layer (L5) having coils (C) is formed on the first surface (F) of the third coil substrate (D3), and a sixth coil layer (L6) having coils (C) is formed on the second surface (S) of the third coil substrate (D3). An eighth coil layer (L8) having coils (C) is formed on the first surface (F) of the fourth coil substrate (D4), and a seventh coil layer (L7) having coils (C) is formed on the second surface (S) of the fourth coil substrate (D4).

In the example of FIG. 1, the first coil layer (L1) has a third coil (c3) and a fourth coil (c4).

The second coil layer (L2) has a first coil (c1), a second coil (c2), a fifth coil (c5) and a forty-second coil (c42).

The third coil layer (L3) has a sixth coil (c6), a ninth coil (c9), a tenth coil (c10), a thirty-seventh coil (c37), a thirty-eighth coil (c38), and a forty-first coil (c41).

The fourth coil layer (L4) has a seventh coil (c7), an eighth coil (c8), an eleventh coil (c11), a thirty-sixth coil (c36), a thirty-ninth coil (c39), and a fortieth coil (c40).

The fifth coil layer (L5) has a twelfth coil (c12), a fifteenth coil (c15), a sixteenth coil (c16), a thirty-first coil (c31), a thirty-second coil (c32), and a thirty-fifth coil (c35).

The sixth coil layer (L6) has a thirteenth coil (c13), a fourteenth coil (c14), a seventeenth coil (c17), a thirtieth coil (c30), a thirty-third coil (c33), and a thirty-fourth coil (c34).

The seventh coil layer (L7) has an eighteenth coil (c18), a twenty-first coil (c21), a twenty-second coil (c22), a twenty-fifth coil (c25), a twenty-sixth coil (c26), and a twenty-ninth coil (c29).

The eighth coil layer (L8) has a nineteenth coil (c19), a twentieth coil (c20), a twenty-third coil (c23), a twenty-fourth coil (c24), a twenty-seventh coil (c27), and a twenty-eighth coil (c28).

In this way, multiple coils (C) are formed on the first surface (F) of each of the coil substrates (D). The number of the coils (C) formed on the first surface (F) of each of the coil substrates (D) is an even number. Multiple coils (C) are formed on the second surface (S) of each of the coil substrates (D). The number of the coils (C) formed on the second surface (S) of each of the coil substrates (D) is an even number.

It is possible to remove, for example, the first coil (c1), the second coil (c2) and the third coil (c3) from the example of FIG. 1.

It is possible to remove, for example, the third coil substrate (D3) and the fourth coil substrate (D4) from the example of FIG. 1. In this case, the coils (C) from the tenth coil (c10) to the thirty-seventh coil (c37) are removed. Then, the ninth coil (c9) and the thirty-eighth coil (c38) are connected to each other by a connection wire (i).

In the example of FIG. 1, the first coil layer (L1) has two coils (C). The second coil layer (L2) has four coils (C). The third coil layer (L3), the fourth coil layer (L4), the fifth coil layer (L5), the sixth coil layer (L6), the seventh coil layer (L7) and the eighth coil layer (L8) each have six coils (C). In this way, the coil layers (L1, L2, L3, L4, L5, L6, L7, L8) each have multiple coils (C). The number of the coils (C) formed in each of the coil layers (L1, L2, L3, L4, L5, L6, L7, L8) is an even number. The numbers of the coils (C) formed in the coil layers (L1, L2, L3, L4, L5, L6, L7, L8) do not completely match each other.

One coil and other coils formed in the laminated coil substrate 10 can be connected to each other by the through-hole conductors (T) and the connection wires (connection wirings) (i).

In the example of FIG. 1, the first coil (c1) and the second coil (c2) are connected to each other by a first connection wire (i1). The second coil (c2) and the third coil (c3) are connected to each other by a second through-hole conductor (t2). The third coil (c3) and the fourth coil (c4) are connected to each other by a second connection wire (i2). The fourth coil (c4) and the fifth coil (c5) are connected to each other by a third through-hole conductor (t3). The fifth coil (c5) and the sixth coil (c6) are connected to each other by a third connection wire (i3). The sixth coil (c6) and the seventh coil (c7) are connected to each other by a fourth through-hole conductor (t4). The seventh coil (c7) and the eighth coil (c8) are connected to each other by a fourth connection wire (i4). The eighth coil (c8) and the ninth coil (c9) are connected to each other by a fifth through-hole conductor (t5). The ninth coil (c9) and the tenth coil (c10) are connected to each other by a fifth connection wire (i5). The tenth coil (c10) and the eleventh coil (c11) are connected to each other by a sixth through-hole conductor (t6). The eleventh coil (c11) and the twelfth coil (c12) are connected to each other by a sixth connection wire (i6). The twelfth coil (c12) and the thirteenth coil (c13) are connected to each other by a seventh through-hole conductor (t7). The thirteenth coil (c13) and the fourteenth coil (c14) are connected to each other by a seventh connection wire (i7). The fourteenth coil (c14) and the fifteenth coil (c15) are connected to each other by a eighth through-hole conductor (t8). The fifteenth coil (c15) and the sixteenth coil (c16) are connected to each other by an eighth connection wire (i8). The sixteenth coil (c16) and the seventeenth coil (c17) are connected to each other by a ninth through-hole conductor (t9). The seventeenth coil (c17) and the eighteenth coil (c18) are connected to each other by a ninth connection wire (i9). The eighteenth coil (c18) and the nineteenth coil (c19) are connected to each other by a tenth through-hole conductor (t10). The nineteenth coil (c19) and the twentieth coil (c20) are connected to each other by a tenth connection wire (i10). The twentieth coil (c20) and the twenty-first coil (c21) are connected to each other by an eleventh through-hole conductor (t11). The twenty-first coil (c21) and the twenty-second coil (c22) are connected to each other by an eleventh connection wire (i11). The twenty-second coil (c22) and the twenty-third coil (c23) are connected to each other by a twelfth through-hole conductor (t12). The twenty-third coil (c23) and the twenty-fourth coil (c24) are connected to each other by a twelfth connection wire (i12). The twenty-fourth coil (c24) and the twenty-fifth coil (c25) are connected to each other by a thirteenth through-hole conductor (t13). The twenty-fifth coil (c25) and the twenty-sixth coil (c26) are connected to each other by a thirteenth connection wire (i13). The twenty-sixth coil (c26) and the twenty-seventh coil (c27) are connected to each other by a fourteenth through-hole conductor (t14). The twenty-seventh coil (c27) and the twenty-eighth coil (c28) are connected to each other by a fourteenth connection wire (i14). The twenty-eighth coil (c28) and the twenty-ninth coil (c29) are connected to each other by a fifteenth through-hole conductor (t15). The twenty-ninth coil (c29) and the thirtieth coil (c30) are connected to each other by a fifteenth connection wire (i15). The thirtieth coil (c30) and the thirty-first coil (c31) are connected to each other by a sixteenth through-hole conductor (t16). The thirty-first coil (c31) and the thirty-second coil (c32) are connected to each other by a sixteenth connection wire (i16).

The thirty-second coil (c32) and the thirty-third coil (c33) are connected to each other by a seventeenth through-hole conductor (t17). The thirty-third coil (c33) and the thirty-fourth coil (c34) are connected to each other by a seventeenth connection wire (i17). The thirty-fourth coil (c34) and the thirty-fifth coil (c35) are connected to each other by an eighteenth through-hole conductor (t18). The thirty-fifth coil (c35) and the thirty-sixth coil (c36) are connected to each other by an eighteenth connection wire (i18). The thirty-sixth coil (c36) and the thirty-seventh coil (c37) are connected to each other by a nineteenth through-hole conductor (t19). The thirty-seventh coil (c37) and the thirty-eighth coil (c38) are connected to each other by a nineteenth connection wire (i19). The thirty-eighth coil (c38) and the thirty-ninth coil (c39) are connected to each other by a twentieth through-hole conductor (t20). The thirty-ninth coil (c39) and the fortieth coil (c40) are connected to each other by a twentieth connection wire (i20). The fortieth coil (c40) and the forty-first coil (c41) are connected to each other by a twenty-first through-hole conductor (t21). The forty-first coil (c41) and the forty-second coil (c42) are connected to each other by a twenty-first connection wire (i21).

In this way, the coil layer on the first surface (F) and the coil layer on the second surface (S) formed in one coil substrate (D) are connected to each other by the through-hole conductors (T). The connection between the coils (C) on the first surface (F) formed in one coil substrate (D) is performed with the connection wires (i). The connection between the coils (C) on the second surface (S) formed in one coil substrate (D) is performed with the connection wires (i). A coil formed on one coil substrate and a coil formed on another coil substrate are connected to each other by a connection wire (i). All of the coils (C) are connected to each other via the through-hole conductors (T) and the connection wires (i). When two coils are connected to each other by a connection wire (i), the next two coils are connected to each other by a through-hole conductor (T). As methods for connecting between the coils (C), the connection wires (i) and the through-hole conductors (T) are alternately formed.

In the example of FIG. 1, the first coil substrate (D1) and the second coil substrate (D2) are connected to each other by the connection wires (i3, i21). The coil (fifth coil (c5)) formed on the first coil substrate (D1) and the coil (sixth coil (c6)) formed on the second coil substrate (D2) are connected to each other by the connection wire (third connection wire (i3)). The coil (forty-second coil (c42)) formed on the first coil substrate (D1) and the coil (forty-first coil (c41)) formed on the second coil substrate (D2) are connected to each other by the connection wire (twenty-first connection wire (i21)).

The second coil substrate (D2) and the third coil substrate (D3) are connected to each other by the connection wires (i6, i18). The coil (eleventh coil (c11)) formed on the second coil substrate (D2) and the coil (twelfth coil (c12)) formed on the third coil substrate (D3) are connected to each other by the connection wire (sixth connection wire (i6)). The coil (thirty-sixth coil (c36)) formed on the second coil substrate (D2) and the coil (thirty-fifth coil (c35)) formed on the third coil substrate (D3) are connected to each other by the connection wire (eighteenth connection wire (i18)).

The third coil substrate (D3) and the fourth coil substrate (D4) are connected to each other by the connection wires (i9, i15). The coil (seventeenth coil (c17)) formed on the third coil substrate (D3) and the coil (eighteenth coil (c18)) formed on the fourth coil substrate (D4) are connected to each other by the connection wire (ninth connection wire (i9)). The coil (thirtieth coil (c30)) formed on the third coil substrate (D3) and the coil (twenty-ninth coil (c29)) formed on the fourth coil substrate (D4) are connected to each other by the connection wire (fifteenth connection wire (i15)).

A coil (C) on one coil substrate and a coil (C) on another coil substrate are connected to each other by a connection wire (i) extending from the one coil substrate to the other coil substrate. A connection wire (i) connecting to each other a coil (C) on one coil substrate and a coil (C) on another coil substrate is an intersubstrate connection wire (ii). An intersubstrate connection wire (ii) formed on the first surface (F) is a first intersubstrate connection wire (iiF), and an intersubstrate connection wire (ii) formed on the second surface (S) is a second intersubstrate connection wire (iiS). As illustrated in FIG. 1, in the printed wiring board 100, the first intersubstrate connection wires (iiF) and the second intersubstrate connection wires (iiS) are alternately formed.

A coil layer on one coil substrate and a coil layer on another coil substrate are connected to each other by two intersubstrate connection wires (ii).

The coils (C) are preferably planar coils. The coils (C) preferably each have a spiral shape.

The coils (C) are each connected to a through-hole conductor (T) at a central portion of the coil. The coils (C) are each a coil formed around a through-hole conductor (T). A through-hole conductor (T) is formed at a central portion of each of the coils (C). A through-hole conductor (T) is formed at a central portion of a coil. Further, the coils (C) are each connected to a connection wire (i) at an outer peripheral portion.

When a coil (C) on the first surface (F) and a coil (C) on the second surface (S) are directly connected to each other via a through-hole conductor (T), the coil (C) on the first surface (F) is referred to as a first vertical connection coil, and the coil (C) on the second surface (S) is referred to as a second vertical connection coil. The first vertical connection coil and the second vertical connection coil are symmetrically formed with respect to the resin substrate 101. A winding direction of the first vertical connection coil and a winding direction of the second vertical connection coil are the same. For example, magnetic flux can be increased.

A direction of a current flowing through the first vertical connection coil and a direction of a current flowing through the second vertical connection coil are the same. For example, magnetic flux can be increased. The winding directions and the current directions are observed from a position above the first surface (F) of the printed wiring board 100. The third coil (c3) of FIG. 1 and the second coil (c2) of FIG. 1 are directly connected to each other by the second through-hole conductor (t2). The winding direction of the third coil (c3) and the winding direction of the second coil (c2) are counterclockwise. A direction of a current flowing through the first vertical connection coil and a direction of a current flowing through the second vertical connection coil are the same. The direction of the current flow is observed from a position above the first surface (F) of the printed wiring board 100.

When two coils are directly connected to each other via a connection wire (i), one coil is referred to as a first planar connection coil and the other coil is referred to as a second planar connection coil. When a first planar connection coil and a second planar connection coil are connected to each other by an intersubstrate connection wire (ii), the winding direction of the first planar connection coil and the winding direction of the second planar connection coil are opposite to each other. The eleventh coil (c11) of FIG. 1 and the twelfth coil (c12) in FIG. 1 are connected to each other by the sixth connection wire (i6). The sixth connection wire (i6) is an intersubstrate connection wire (ii). The winding direction of the eleventh coil (c11) is counterclockwise, and the winding direction of the twelfth coil (c12) is clockwise. The winding directions and the current directions are observed from a position above the first surface (F) of the printed wiring board 100. When the laminated coil substrate 10 is manufactured from the printed wiring board 100, the winding directions of two coils sandwiching an adhesive layer 22 are the same. For example, when the coils are observed from a position above an uppermost surface (MUF) of the laminated coil substrate 10, the eleventh coil (c111) and the twelfth coil (c12) in the laminated coil substrate 10 face each other via the adhesive layer 22. When the winding directions of the coils are observed from a position above the uppermost surface (MUF) (the first surface (F) of the first coil substrate (D1)) of the laminated coil substrate 10, the winding direction of the eleventh coil (c11) in the laminated coil substrate is counterclockwise, and the winding direction of the twelfth coil (c12) in the laminated coil substrate is counterclockwise. For example, magnetic flux can be increased.

When a first planar connection coil and a second planar connection coil are connected to each other by an intersubstrate connection wire (ii), the direction of the current flowing through the first planar connection coil and the direction of the current flowing through the second planar connection coil are opposite to each other. For example, the current flows counterclockwise through the eleventh coil (c11). The current flows clockwise through the twelfth coil (c12). The direction of the current flow is observed from a position above the first surface (F) of the printed wiring board 100. When the laminated coil substrate 10 is manufactured from the printed wiring board 100, the directions of the currents flowing through two coils sandwiching an adhesive layer 22 are the same. For example, when the coils are observed from a position above an uppermost surface (MUF) of the laminated coil substrate 10, the eleventh coil (c11) and the twelfth coil (c12) in the laminated coil substrate 10 face each other via the adhesive layer 22. When the current directions are observed from a position above the uppermost surface (MUF) (the first surface (F) of the first coil substrate (D1)) of the laminated coil substrate 10, the current flows counterclockwise through the eleventh coil (c11) in the laminated coil substrate and flows counterclockwise through the twelfth coil (c12) in the laminated coil substrate. For example, magnetic flux can be increased.

When a first planar connection coil and a second planar connection coil are connected to each other by a connection wire (i), the winding direction of the first planar connection coil and the winding direction of the second planar connection coil are opposite to each other. For example, the seventh coil (c7) of FIG. 1 and the eighth coil (c8) of FIG. 1 are connected to each other by the fourth connection wire (i4). The winding direction of the seventh coil (c7) is counterclockwise, and the winding direction of the eighth coil (c8) is clockwise. The fifteenth coil (c15) of FIG. 1 and the sixteenth coil (c16) of FIG. 1 are connected to each other by the eighth connection wire (i8). The winding direction of the fifteenth coil (c15) is counterclockwise, and the winding direction of the sixteenth coil (c16) is clockwise. The winding directions are observed from a position above the first surface (F) of the printed wiring board 100. When the laminated coil substrate 10 is manufactured from the printed wiring board 100, the winding directions of two coils sandwiching an adhesive layer 22 are the same. For example, when the coils are observed from a position above the uppermost surface (MUF) (for example, the first surface (F) of the first coil substrate) of the laminated coil substrate 10, the seventh coil (c7) and the sixteenth coil (c16) in the laminated coil substrate 10 face each other via the adhesive layer 22. The eighth coil (c8) and the fifteenth coil (c15) face each other via the adhesive layer 22. Then, when the winding directions of the coils are observed from a position above the uppermost surface (MUF) (for example, the first surface (F) of the first coil substrate) of the laminated coil substrate 10, the winding direction of the seventh coil (c7) and the winding direction of the sixteenth coil (c16) are the same. The winding directions of both the seventh coil (c7) and the sixteenth coil (c16) are clockwise. The winding direction of the eighth coil (c8) and the winding direction of the fifteenth coil (c15) are the same. The winding directions of both the eighth coil (c8) and the fifteenth coil (c15) are counterclockwise. By folding the printed wiring board 100, the winding directions of coils opposing each other via an adhesive layer 22 are the same. For example, magnetic flux can be increased.

When a first planar connection coil and a second planar connection coil are connected to each other by a connection wire (i), the direction of the current flowing through the first planar connection coil and the direction of the current flowing through the second planar connection coil are opposite to each other. For example, the seventh coil (c7) of FIG. 1 and the eighth coil (c8) of FIG. 1 are connected to each other by the fourth connection wire (i4). The direction of the current flowing through the seventh coil (c7) is counterclockwise, and the direction of the current flowing through the eighth coil (c8) is clockwise. The fifteenth coil (c15) of FIG. 1 and the sixteenth coil (c16) of FIG. 1 are connected to each other by the eighth connection wire (i8). The direction of the current flowing through the fifteenth coil (c15) is counterclockwise, and the direction of the current flowing through the sixteenth coil (c16) is clockwise. The directions of the currents flowing through the coils are observed from a position above the first surface (F) of the printed wiring board 100. When the laminated coil substrate 10 is manufactured from the printed wiring board 100, the directions of the currents flowing through the two coils sandwiching an adhesive layer 22 are the same. For example, when the coils are observed from a position above the uppermost surface (MUF) (for example, the first surface (F) of the first coil substrate) of the laminated coil substrate 10, the seventh coil (c7) and the sixteenth coil (c16) in the laminated coil substrate 10 face each other via the adhesive layer 22. The eighth coil (c8) and the fifteenth coil (c15) face each other via the adhesive layer 22. Then, when the current directions are observed from a position above the uppermost surface (MUF) (for example, the first surface (F) of the first coil substrate) of the laminated coil substrate 10, the direction of the current flowing through the seventh coil (c7) and the direction of the current flowing through the sixteenth coil (c16) are the same. The direction of the current flowing through the seventh coil (c7) and the direction of the current flowing through the sixteenth coil (c16) are clockwise. The direction of the current flowing through the eighth coil (c8) and the direction of the current flowing through the fifteenth coil (c15) are the same. The direction of the current flowing through the eighth coil (c8) and the direction of the current flowing through the fifteenth coil (c15) are counterclockwise. By folding the printed wiring board 100, the directions of the currents flowing through two coils opposing each other via an adhesive layer 22 are the same. For example, magnetic flux can be increased.

The winding directions of the coils (C) and the directions of the currents flowing through the coils (C) in the laminated coil substrate 10 are observed from a position above the uppermost surface (MUF) of the laminated coil substrate 10.

A flow direction of a current flowing though the printed wiring board 100 illustrated in FIG. 1 is described next.

A current (input current) from an input (in1) formed on the first surface (F) of the first coil substrate (D1) reaches the first coil (c1) via a first through-hole conductor (t1). Thereafter, the input current flows through the first coil (c1). The input current flows from the central portion of the first coil which is formed in a spiral shape toward outside. The winding direction of the first coil (c1) is clockwise. The input current flows clockwise through the first coil. Thereafter, the input current reaches the second coil (c2) via the first connection wire (i1). The first connection wire (i1) is formed on the second surface (S) of the first coil substrate (D1). Thereafter, the input current flows through the second coil (c2) and reaches the second through-hole conductor (t2) formed at the central portion of the second coil (c2). In the second coil (c2), the current flows from the outside to the central portion of the coil which is formed in a spiral shape. The winding direction of the second coil (c2) is counterclockwise. The input current flows counterclockwise through the second coil (c2). Then, the input current reaches the third coil (c3) via the second through-hole conductor (t2). Thereafter, the input current flows through the third coil (c3). In the third coil (c3), the current flows from the central portion of the coil which is formed in a spiral shape toward outside. The winding direction of the third coil (c3) is counterclockwise. The input current flows counterclockwise through the third coil (c3). Thereafter, the input current reaches the second connection wire (i2). Thereafter, the input current flows through the fourth coil (c4) and reaches the third through-hole conductor (t3). The second connection wire (i2) is formed on the first surface (F)) of the first coil substrate (D1). In the fourth coil (c4), the current flows from the outside to the central portion of the coil which is formed in a spiral shape. The winding direction of the fourth coil (c4) is clockwise. The input current flows clockwise through the fourth coil (c4). Thereafter, the input current passes through the third through-hole conductor (t3) and reaches the fifth coil (c5). Then, the input current reaches the third connection wire (i3) via the fifth coil (c5). In the fifth coil (c5), the input current flows from the central portion of the coil toward outside. The winding direction of the fifth coil (c5) is clockwise. The input current flows clockwise through the fifth coil (c5). The third connection wire (i3) is formed on the second surface (S) of the first coil substrate (D1) and the second surface (S) of the second coil substrate (D2). The third connection wire (i3) extends from the first coil substrate (D1) to the second coil substrate (D2). Via the third connection wire (i3), the input current reaches the sixth coil (c6). The input current reaches the fourth through-hole conductor (t4) via the sixth coil (c6). In the sixth coil (c6), the input current flows from the outside toward the central portion of the coil. The winding direction of the sixth coil (c6) is counterclockwise. The input current flows counterclockwise through the sixth coil (c6). Then, via the fourth through-hole conductor (t4), the input current reaches the seventh coil (c7). In the seventh coil (c7), the input current flows from the central portion of the coil toward outside. The winding direction of the seventh coil (c7) is counterclockwise. The input current flows counterclockwise through the seventh coil (c7). Then, the input current reaches the fourth connection wire (i4). The fourth connection wire (i4) is formed on the first surface (F)) of the second coil substrate (D2). Via the fourth connection wire (i4), the input current reaches the eighth coil (c8). Thereafter, the input current reaches the fifth through-hole conductor (t5) via the eighth coil (c8). In the eighth coil (c8), the input current flows from the outside toward the central portion of the coil. The winding direction of the eighth coil (c8) is clockwise. The input current flows clockwise through the eighth coil (c8). Via the fifth through-hole conductor (t5), the input current reaches the ninth coil (c9). Thereafter, the input current reaches the fifth connection wire (i5) via the ninth coil (c9). In the ninth coil (c9), the input current flows from the central portion of the coil toward outside. The winding direction of the ninth coil (c9) is clockwise. The input current flows clockwise through the ninth coil (c9). The fifth connection wire (i5) is formed on the second surface (S) of the second coil substrate (D2). The input current reaches the tenth coil (c10) from the fifth connection wire (i5). Via the tenth coil (c10) which is formed on the second surface (S) of the second coil substrate (D2), the input current reaches the sixth through-hole conductor (t6). In the tenth coil (c10), the input current flows from the outside toward the central portion of the coil. The winding direction of the tenth coil (c10) is counterclockwise. The input current flows counterclockwise through the tenth coil (c10). Via the sixth through-hole conductor (t6), the input current reaches the eleventh coil (c11). Thereafter, the input current reaches the sixth connection wire (i6) via the eleventh coil (c11). In the eleventh coil (c11), the current flows from the central portion of the coil toward outside. The winding direction of the eleventh coil (c11) is counterclockwise. The input current flows counterclockwise through the eleventh coil (c11). Then, the input current reaches the twelfth coil (c12) via the sixth connection wire (i6). The sixth connection wire (i6) is formed on the first surface (F) of the second coil substrate (D2) and the first surface (F) of the third coil substrate (D3). The sixth connection wire (i6) extends from the second coil substrate (D2) to the third coil substrate (D3). The input current output from the sixth connection wire (i6) reaches the seventh through-hole conductor (t7) via the twelfth coil (c12). In the twelfth coil (c12), the input current flows from the outside toward the central portion of the coil. The winding direction of the twelfth coil (c12) is clockwise. The input current flows clockwise through the twelfth coil (c12). Then, the input current reaches the thirteenth coil (c13) via the seventh through-hole conductor (t7). Then, the input current reaches the seventh connection wire (i7) via the thirteenth coil (c13). In the thirteenth coil (c13), the input current flows from the central portion of the coil toward outside. The winding direction of the thirteenth coil (c13) is clockwise. The input current flows clockwise through the thirteenth coil (c13). The seventh connection wire (i7) is formed on the second surface (S) of the third coil substrate (D3). The input current output from the seventh connection wire (i7) reaches the fourteenth coil (c14). Thereafter, the input current reaches the eighth through-hole conductor (t8) formed at the central portion of the fourteenth coil (c14). In the fourteenth coil (c14), the current flows from the outside toward the central portion of the coil. The winding direction of the fourteenth coil (c14) is counterclockwise. The input current flows counterclockwise through the fourteenth coil (c14). The input current reaches the fifteenth coil (c15) via the eighth through-hole conductor (t8). Thereafter, the input current reaches the eighth connection wire (i8) via the fifteenth coil (c15). In the fifteenth coil (c15), the input current flows from the central portion of the coil toward outside. The winding direction of the fifteenth coil (c15) is counterclockwise. The input current flows counterclockwise through the fifteenth coil (c15). The eighth connection wire (i8) is formed on the first surface (F)) of the third coil substrate (D3). The input current output from the eighth connection wire (i8) reaches the ninth through-hole conductor (t9) via the sixteenth coil (c16). In the sixteenth coil (c16), the input current flows from the outside toward the central portion of the coil. The winding direction of the sixteenth coil (c16) is clockwise. The input current flows clockwise through the sixteenth coil (c16). Thereafter, the input current reaches the seventeenth coil (c17) via the ninth through-hole conductor (t9). Then, the input current reaches the ninth connection wire (i9) via the seventeenth coil (c17). In the seventeenth coil (c17), the input current flows from the central portion of the coil toward outside. The winding direction of the seventeenth coil (c17) is clockwise. The input current flows clockwise through the seventeenth coil (c17). The ninth connection wire (i9) is formed on the second surface (S) of the third coil substrate (D3) and the second surface (S) of the fourth coil substrate (D4). The ninth connection wire (i9) extends from the third coil substrate (D3) to the fourth coil substrate (D4). The input current output from the ninth connection wire (i9) reaches the tenth through-hole conductor (t10) via the eighteenth coil (c18). In the eighteenth coil (c18), the input current flows from the outside toward the central portion of the coil. The winding direction of the eighteenth coil (c18) is counterclockwise. The input current flows counterclockwise through the eighteenth coil (c18). Then, the input current reaches the nineteenth coil (c19) via the tenth through-hole conductor (t10). Thereafter, the input current reaches the tenth connection wire (i10) via the nineteenth coil (c19). In the nineteenth coil (c19), the input current flows from the central portion of the coil toward outside. The winding direction of the nineteenth coil (c19) is counterclockwise. The input current flows counterclockwise through the nineteenth coil (c19). The tenth connection wire (i10) is formed on the first surface (F)) of the fourth coil substrate (D4). The input current output from the tenth connection wire (i10) reaches the eleventh through-hole conductor (t11) via the twentieth coil (c20). In the twentieth coil (c20), the input current flows from the outside toward the central portion of the coil. The winding direction of the twentieth coil (c20) is clockwise. The input current flows clockwise through the twentieth coil (c20). Via the eleventh through-hole conductor (t11), the input current reaches the twenty-first coil (c21). Then, the input current reaches the eleventh connection wire (i11) via the twenty-first coil (c21). In the twenty-first coil (c21), the input current flows from the central portion of the coil toward outside. The winding direction of the twenty-first coil (c21) is clockwise. The input current flows clockwise through the twenty-first coil (c21). The eleventh connection wire (i11) is formed on the second surface (S) of the fourth coil substrate (D4). The input current output from the eleventh connection wire (i11) reaches the twelfth through-hole conductor (t12) via the twenty-second coil (c22). In the twenty-second coil (c22), the input current flows from the outside toward the central portion of the coil. The winding direction of the twenty-second coil (c22) is counterclockwise. The input current flows counterclockwise through the twenty-second coil (c22). The input current reaches the twenty-third coil (c23) via the twelfth through-hole conductor (t12). Thereafter, the input current reaches the twelfth connection wire (i12) via the twenty-third coil (c23). In the twenty-third coil (c23), the input current flows from the central portion of the coil toward outside. The winding direction of the twenty-third coil (c23) is counterclockwise. The input current flows counterclockwise through the twenty-third coil (c23). The twelfth connection wire (i12) is formed on the first surface (F)) of the fourth coil substrate (D4). The input current output from the twelfth connection wire (i12) reaches the thirteenth through-hole conductor (t13) via the twenty-fourth coil (c24). In the twenty-fourth coil (c24), the input current flows from the outside toward the central portion of the coil. The winding direction of the twenty-fourth coil (c24) is clockwise. The input current flows clockwise through the twenty-fourth coil (c24). Then, the input current reaches the twenty-fifth coil (c25) via the thirteenth through-hole conductor (t13). Thereafter, the input current reaches the thirteenth connection wire (i13) via the twenty-fifth coil (c25). In the twenty-fifth coil (c25), the input current flows from the central portion of the coil toward outside. The winding direction of the twenty-fifth coil (c25) is clockwise. The input current flows clockwise through the twenty-fifth coil (c25). The thirteenth connection wire (i13) is formed on the second surface (S) of the fourth coil substrate (D4). The input current output from the thirteenth connection wire (i13) reaches the fourteenth through-hole conductor (t14) via the twenty-sixth coil (c26). In the twenty-sixth coil (c26), the input current flows from the outside toward the central portion of the coil. The winding direction of the twenty-sixth coil (c26) is counterclockwise. The input current flows counterclockwise through the twenty-sixth coil (c26). Via the fourteenth through-hole conductor (t14), the input current reaches the twenty-seventh coil (c27). Thereafter, the input current reaches the fourteenth connection wire (i14) via the twenty-seventh coil (c27). In the twenty-seventh coil (c27), the input current flows from the central portion of the coil toward outside. The winding direction of the twenty-seventh coil (c27) is counterclockwise. The input current flows counterclockwise through the twenty-seventh coil (c27). The fourteenth connection wire (i14) is formed on the first surface (F)) of the fourth coil substrate (D4). The input current output from the fourteenth connection wire (i14) reaches the fifteenth through-hole conductor (t15) via the twenty-eighth coil (c28). In the twenty-eighth coil (c28), the input current flows from the outside toward the central portion of the coil. The winding direction of the twenty-eighth coil (c28) is clockwise. The input current flows clockwise through the twenty-eighth coil (c28). Via the fifteenth through-hole conductor (t15), the input current reaches the twenty-ninth coil (c29). Then, the input current reaches the fifteenth connection wire (i15) via the twenty-ninth coil (c29). In the twenty-ninth coil (c29), the input current flows from the central portion of the coil toward outside. The winding direction of the twenty-ninth coil (c29) is clockwise. The input current flows clockwise through the twenty-ninth coil (c29). The fifteenth connection wire (i15) is formed on the second surface (S) of the fourth coil substrate (D4) and the second surface (S) of the third coil substrate (D3). The fifteenth connection wire (i15) extends from the fourth coil substrate (D4) to the third coil substrate (D3). The input current output from the fifteenth connection wire (i15) reaches the sixteenth through-hole conductor (t16) via the thirtieth coil (c30). In the thirtieth coil (c30), the input current flows from the outside toward the central portion of the coil. The winding direction of the thirtieth coil (c30) is counterclockwise. The input current flows counterclockwise through the thirtieth coil (c30). Thereafter, the input current reaches the thirty-first coil (c31) via the sixteenth through-hole conductor (t16). Then, the input current reaches the sixteenth connection wire (i16) via the thirty-first coil (c31). In the thirty-first coil (c31), the input current flows from the central portion of the coil toward outside. The winding direction of the thirty-first coil (c31) is counterclockwise. The input current flows counterclockwise through the thirty-first coil (c31). The input current output from the sixteenth connection wire (i16) reaches the seventeenth through-hole conductor (t17) via the thirty-second coil (c32). In the thirty-second coil (c32), the input current flows from the outside toward the central portion of the coil. The winding direction of the thirty-second coil (c32) is clockwise. The input current flows clockwise through the thirty-second coil (c32). Via the seventeenth through-hole conductor (t17), the input current reaches the thirty-third coil (c33). Thereafter, the input current reaches the seventeenth connection wire (i17) via the thirty-third coil (c33). In the thirty-third coil (c33), the input current flows from the central portion of the coil toward outside. The winding direction of the thirty-third coil (c33) is clockwise. The input current flows clockwise through the thirty-third coil (c33). The seventeenth connection wire (i17) is formed on the second surface (S) of the third coil substrate (D3). The input current output from the seventeenth connection wire (i17) reaches the eighteenth through-hole conductor (t18) via the thirty-fourth coil (c34). In the thirty-fourth coil (c34), the input current flows from the outside toward the central portion of the coil. The winding direction of the thirty-fourth coil (c34) is counterclockwise. The input current flows counterclockwise through the thirty-fourth coil (c34). Via the eighteenth through-hole conductor (t18), the input current reaches the thirty-fifth coil (c35). The input current reaches the eighteenth connection wire (i18) via the thirty-fifth coil (c35). In the thirty-fifth coil (c35), the input current flows from the central portion of the coil toward outside. The winding direction of the thirty-fifth coil (c35) is counterclockwise. The input current flows counterclockwise through the thirty-fifth coil (c35). The eighteenth connection wire (i18) is formed on the first surface (F) of the third coil substrate (D3) and the first surface (F) of the second coil substrate (D2). The eighteenth connection wire (i18) extends from the third coil substrate (D3) to the second coil substrate (D2). The input current output from the eighteenth connection wire (i18) reaches the nineteenth through-hole conductor (t19) via the thirty-sixth coil (c36). In the thirty-sixth coil (c36), the input current flows from the outside toward the central portion of the coil. The winding direction of the thirty-sixth coil (c36) is clockwise. The input current flows clockwise through the thirty-sixth coil (c36). Via the nineteenth through-hole conductor (t19), the input current reaches the thirty-seventh coil (c37). The input current reaches the nineteenth connection wire (i19) via the thirty-seventh coil (c37). In the thirty-seventh coil (c37), the input current flows from the central portion of the coil toward outside. The winding direction of the thirty-seventh coil (c37) is clockwise. The input current flows clockwise through the thirty-seventh coil (c37). The nineteenth connection wire (i19) is formed on the second surface (S) of the second coil substrate (D2). The input current output from the nineteenth connection wire (i19) reaches the twentieth through-hole conductor (t20) via the thirty-eighth coil (c38). In the thirty-eighth coil (c38), the input current flows from the outside toward the central portion of the coil. The winding direction of the thirty-eighth coil (c38) is counterclockwise. The input current flows counterclockwise through the thirty-eighth coil (c38). The input current reaches the thirty-ninth coil (c39) via the twentieth through-hole conductor (t20). The input current reaches the twentieth connection wire (i20) via the thirty-ninth coil (c39). In the thirty-ninth coil (c39), the input current flows from the central portion of the coil toward outside. The winding direction of the thirty-ninth coil (c39) is counterclockwise. The input current flows counterclockwise through the thirty-ninth coil (c39). The twentieth connection wire (i20) is formed on the first surface (F)) of the second coil substrate (D2). The input current output from the twentieth connection wire (i20) reaches the twenty-first through-hole conductor (t21) via the fortieth coil (c40). The winding direction of the fortieth coil (c40) is clockwise. The input current flows clockwise through the fortieth coil (c40). The input current reaches the forty-first coil (c41) via the twenty-first through-hole conductor (t21). The input current reaches the twenty-first connection wire (i21) via the forty-first coil (c41). In the forty-first coil (c41), the input current flows from the central portion of the coil toward outside. The winding direction of the forty-first coil (c41) is clockwise. The input current flows clockwise through the forty-first coil (c41). The twenty-first connection wire (i21) is formed on the second surface (S) of the second coil substrate (D2) and the second surface (S) of the first coil substrate (D1). The twenty-first connection wire (i21) extends from the second coil substrate (D2) to the first coil substrate (D1). The input current output from the twenty-first connection wire (i21) reaches the twenty-second through-hole conductor (t22) via the forty-second coil (c42). In the forty-second coil (c42), the current flows from the outside toward the central portion of the coil. The winding direction of the forty-second coil (c42) is counterclockwise. The input current flows counterclockwise through the forty-second coil (c42). Via the twenty-second through-hole conductor (t22), the input current reaches an output (out1) formed on the first surface (F) of the first coil substrate (D1).

The printed wiring board 100 of FIG. 1 is for an exemplary purpose. Some of the coils (C) can be removed from the printed wiring board 100 of FIG. 1. Some of the through-hole conductors (T) can be removed from the printed wiring board 100 of FIG. 1. Some of the connection wires (i) can be removed from the printed wiring board 100 of FIG. 1. More coil substrates (D), coils (C), through-hole conductors (T) or connection wires (i) can be added to the printed wiring board 100 of FIG. 1. The winding directions of the coils and the directions of the currents flowing through the coils in the printed wiring board 100 are observed from a position above the first surface (F) of the printed wiring board 100.

When such a printed wiring board is folded, in the laminated coil substrate, the winding directions of two coils opposing each other via the resin substrate 101, or the winding directions of two coils opposing each other via an adhesive layer 22 are the same. Therefore, the currents flow in the same direction in the two coils opposing each other via the resin substrate 101. The currents flow in the same direction in the two coils opposing each other via an adhesive layer 22. Performance of a motor coil can be increased.

As illustrated in FIG. 1, the laminated coil substrate 10 of the embodiment has the connection wires (connection wirings) connecting adjacent coils. Among the multiple connection wires, some connection wires each connect a coil formed on one coil substrate to a coil formed on another coil substrate. Such connection wires are referred to as intersubstrate connection wires (intersubstrate connection wirings) (ii). Due to that the laminated coil substrate 10 of the embodiment has the intersubstrate connection wires (intersubstrate connection wirings) (ii), for example, the number of through-hole conductors can be reduced.

In the embodiment, an adhesive layer 22 is sandwiched between one coil substrate having coils and another coil substrate having coils. One coil substrate having coils and another coil substrate having coils are bonded to each other by an adhesive layer 22. One coil substrate and another coil substrate are adjacent to each other via an adhesive layer 22. Then, a coil formed on one coil substrate and a coil formed on another coil substrate are connected to each other by an intersubstrate connection wire (ii). A coil formed on one coil substrate and a coil formed on another coil substrate are connected to each other only by an intersubstrate connection wire (ii). In that case, a through hole for a through-hole conductor is not formed in the adhesive layer 22. An adhesive force of the adhesive layer can be increased. Insulation resistance between coils sandwiching an adhesive layer can be increased. Warpage of the laminated coil substrate can be reduced. A through hole for a through-hole conductor is not formed in the magnetic sheet 24. For example, a torque of a motor coil can be increased. Insulation resistance between the coils sandwiching the magnetic sheet can be increased. The number of the intersubstrate connection wires (ii) connecting adjacent coil substrates to each other is preferably 2. In FIG. 1, the number of the intersubstrate connection wires (ii) connecting to each other the first coil substrate (D1) and the second coil substrate (D2), which are adjacent to each other, is 2. The second coil substrate (D2) and the third coil substrate (D3) are also connected to each other by two intersubstrate connection wires (ii). The third coil substrate (D3) and the fourth coil substrate (D4) are also connected to each other by two intersubstrate connection wires (ii).

Figure 4:
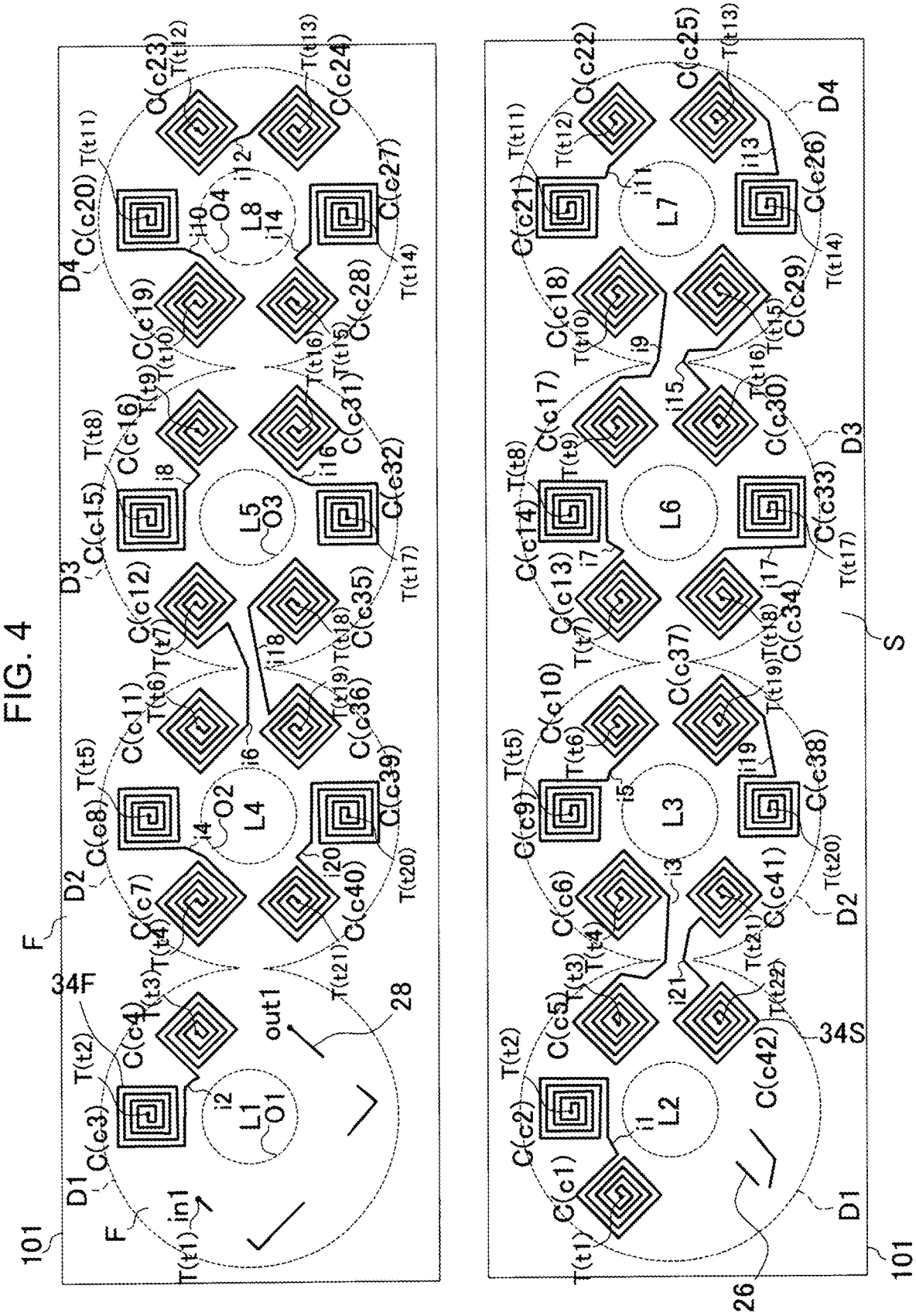
FIG. 4 illustrates a method for manufacturing a printed wiring board for forming a laminated coil substrate according to an embodiment of the present invention.

FIG. 4 illustrates a method for manufacturing the printed wiring board 100 of the embodiment.

The resin substrate 101 having the first surface (F) and the second surface (S) that is on an opposite side with respect to the first surface (F) is prepared. The resin substrate 101 is a flexible substrate of polyimide or the like. In FIG. 4, the resin substrate 101 is formed to include four areas. The first area is formed by the first coil substrate (D1), the second area is formed by the second coil substrate (D2), the third area is formed by a third coil substrate (D3), and the fourth area is formed by the fourth coil substrate (D4). The first coil substrate (D1), the second coil substrate (D2), the third coil substrate (D3) and the fourth coil substrate (D4) are continuous. These coil substrates are connected.

The first conductor layer (34F) is formed on the first surface (F) of the resin substrate 101. The second conductor layer (34S) is formed on the second surface (S) of the resin substrate 101. The through-hole conductors (T) penetrating the resin substrate 101 and connecting the first conductor layer (34F) and the second conductor layer (34S) to each other are formed.

The first conductor layer (34F) includes the first coil layer (L) on the first surface (F) of the first coil substrate (D1), the fourth coil layer (L4) on the first surface (F) of the second coil substrate (D2), the fifth coil layer (L5) on the first surface (F) of the third coil substrate (D3), and the eighth coil layer (L8) on the first surface (F) of the fourth coil substrate (D4). The first coil layer (L1) includes the wiring 28, the coils (C) and the connection wire (i). The fourth coil layer (L4) includes the coils (C) and the connection wires (i). The fifth coil layer (L5) includes the coils (C) and the connection wires (i). The eighth coil layer (L8) includes the coils (C) and the connection wires (i).

The second conductor layer (34S) includes the second coil layer (L2) on the second surface (S) of the first coil substrate (D1), the third coil layer (L3) on the second surface (S) of the second coil substrate (D2), the sixth coil layer (L6) on the second surface (S) of the third coil substrate (D3), and the seventh coil layer (L7) on the second surface (S) of the fourth coil substrate (D4). The second coil layer (L2) includes the wiring 26, the coils (C) and the connection wires (i). The third coil layer (L3) includes the coils (C) and the connection wires (i). The sixth coil layer (L6) includes the coils (C) and the connection wires (i). The seventh coil layer (L7) includes the coils (C) and the connection wires (i).

Then, the resin substrate 101 is cut along a dotted line in FIG. 4. By the cutting, the printed wiring board 100 formed by the four disk-shaped substrates (the first coil substrate (D1), the second coil substrate (D2), the third coil substrate (D3), and the fourth coil substrate (D4)) is formed. An opening (O1) is formed at a center of the first coil substrate (D1). An opening (O2) is formed at a center of the second coil substrate (D2). An opening (O3) is formed at a center of the third coil substrate (D3). An opening (O4) is formed at a center of the fourth coil substrate (D4). The printed wiring board 100 illustrated in FIG. 3A is manufactured. In the printed wiring board 100, adjacent coil substrates (D) are connected to each other. Then, the printed wiring board 100 is folded such that adjacent coil substrates overlap each other (FIG. 3B). In this case, an adhesive layer 22 is sandwiched between each pair of adjacent coil substrates. At least one of the adhesive layers 22 is formed of a magnetic sheet 24. In FIG. 3C, the magnetic sheet 24 is formed between the second coil substrate (D2) and the third coil substrate (D3). The coil substrates (C) and the adhesive layers 22 are integrated, for example, by hot pressing. The laminated coil substrate 10 illustrated in FIG. 3C is completed.

According to the laminated coil substrate 10 of the embodiment, the connection between the coil substrates (D) is performed using the connection wires (i). Therefore, connection reliability between the coil substrates can be increased. Through-hole conductors penetrating the adhesive layers 22 can be eliminated. The laminated coil substrate 10 can be manufactured by folding the printed wiring board 100. The manufacturing method can be simplified.

As illustrated in FIG. 3C, a magnet 30 is placed below the laminated coil substrate 10. The magnet 30 may be placed directly below the laminated coil substrate 10. The magnet 30 is formed by a first magnet (M1), a second magnet (M2), a third magnet (M3), a fourth magnet (M4), a fifth magnet (M5) and a sixth magnet (M6). An upper surface of the first magnet (M1) is an S pole; an upper surface of the second magnet (M2) is an N pole; an upper surface of the third magnet (M3) is an S pole; an upper surface of the fourth magnet (M4) is an N pole; an upper surface of the fifth magnet (M5) is an S pole; and an upper surface of the sixth magnet (M6) is an N pole. Further, a disk-shaped iron plate 40 is placed directly below the magnet 30.

Figure 5A:
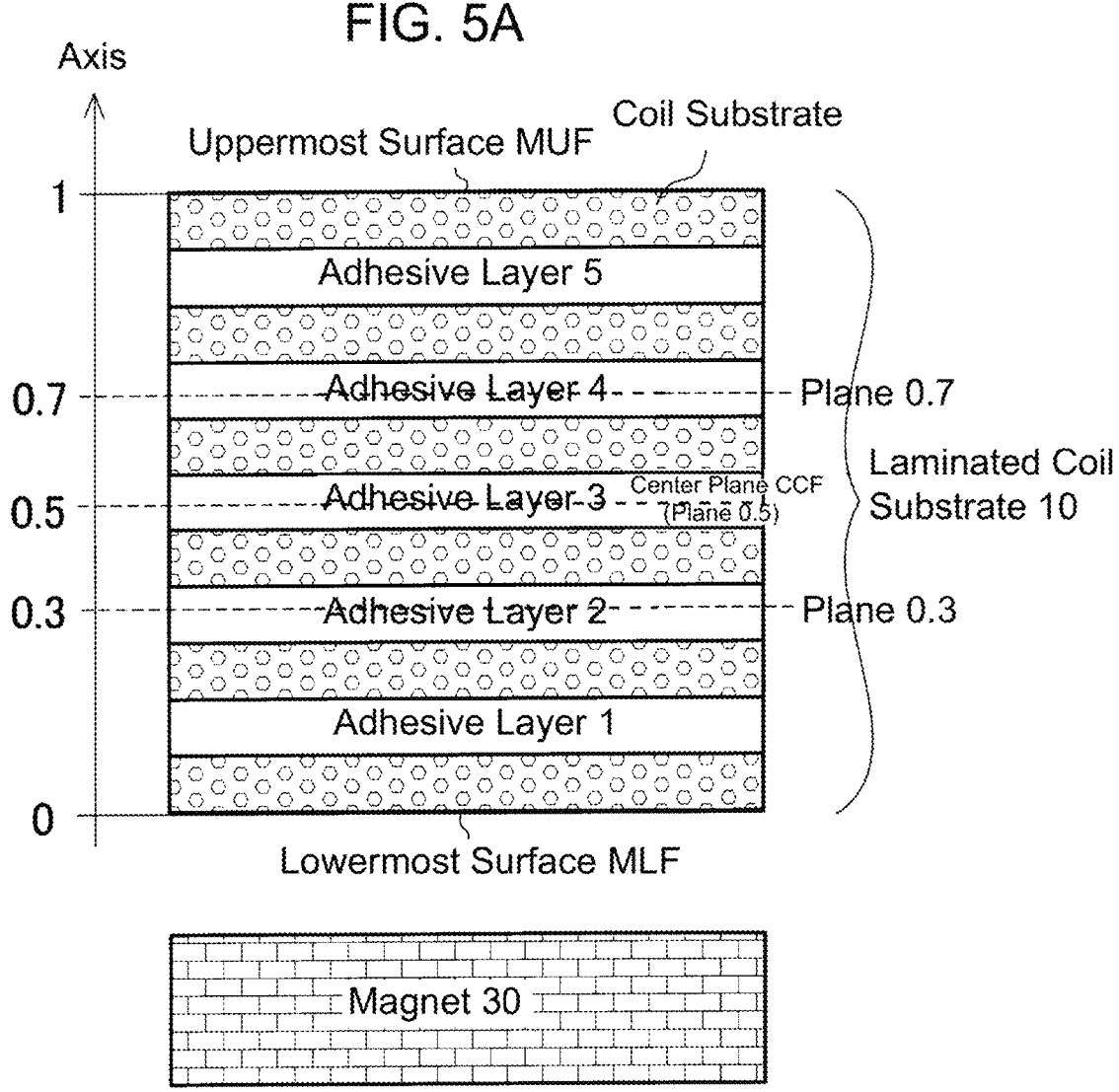
FIG. 5A illustrates positions of adhesive layers in a laminated coil substrate according to an embodiment of the present invention.

FIG. 5A is a cross-sectional view of a motor coil that includes the magnet 30 and the laminated coil substrate 10. The laminated coil substrate 10 is formed by the coil substrates (D) and the adhesive layers 22, and the coil substrates (D) and the adhesive layers 22 are alternately laminated. Then, the laminated coil substrate 10 has a lowermost surface (MLF) that opposes the magnet, an uppermost surface (MUF) that is on an opposite side with respect to the lowermost surface (MLF), and a center plane (CCF) that is positioned equidistant from the lowermost surface (MLF) and the uppermost surface (MUF).

Further, the laminated coil substrate 10 has positions in a thickness direction of the laminated coil substrate 10. The positions are digitized using numerical values between 0 and 1. The numerical values of the positions are indicated on a left side of an axis in FIG. 5A. The position of the lowermost surface (MLF) is represented by 0 and is referred to as a position 0. The position of the center plane (CCF) is represented by 0.5 and is referred to as a position 0.5. The position of the uppermost surface (MUF) is represented by 1 and is referred to as a position 1. In FIG. 5A, a position represented by 0.3 is illustrated. That position is referred to as a position 0.3. A ratio of a distance between the lowermost surface (MLF) and the position 0.3 to a distance between the lowermost surface (MLF) and the uppermost surface (MUF) (that is, (the distance between the lowermost surface (MLF) and the position 0.3)/(the distance between the lowermost surface (MLF) and the uppermost surface (MUF))) is 0.3. In FIG. 5A, a position represented by 0.7 is illustrated. That position is referred to as a position 0.7. A ratio of a distance between the lowermost surface (MLF) and the position 0.7 to a distance between the lowermost surface (MLF) and the uppermost surface (MUF) (that is, (the distance between the lowermost surface (MLF) and the position 0.7)/(the distance between the lowermost surface (MLF) and the uppermost surface (MUF))) is 0.7.

A plane that passes through the position 0.3 and is substantially parallel to the lowermost surface or the center plane or the uppermost surface is represented as a plane 0.3. Then, an adhesive layer 2 illustrated in FIG. 5A includes the plane 0.3. The plane 0.3 passes through the adhesive layer 2. A position of such an adhesive layer 2 is the position 0.3, and the adhesive layer 2 is formed at the position 0.3.

A plane that passes through the position 0.5 and is substantially parallel to the lowermost surface or the center plane or the uppermost surface is represented as a plane 0.5. Then, an adhesive layer 3 illustrated in FIG. 5A includes the plane 0.5. The plane 0.5 passes through the adhesive layer 3. A position of such an adhesive layer 3 is the position 0.5, and the adhesive layer 3 is formed at the position 0.5.

A plane that passes through the position 0.7 and is substantially parallel to the lowermost surface or the center plane or the uppermost surface is represented as a plane 0.7. Then, an adhesive layer 4 illustrated in FIG. 5A includes the plane 0.7. The plane 0.7 passes through the adhesive layer 4. A position of such an adhesive layer 4 is the position 0.7, and the adhesive layer 4 is formed at the position 0.7.

FIG. 6A-6C illustrate relationships between adhesive layers and positions.

The adhesive layers 3 that are respectively illustrated in FIG. 6A-6C each include the plane 0.5. Therefore, the adhesive layers 3 that are respectively illustrated in FIG. 6A-6C are each formed at the position 0.5. A position of each of the adhesive layers 3 that are respectively illustrated in FIG. 6A-6C is the position 0.5.

Similarly, when an adhesive layer includes the plane 0.7, the adhesive layer is formed at the position 0.7. When an adhesive layer includes the plane 0.3, the adhesive layer is formed at the position 0.3.

Figure 8A:
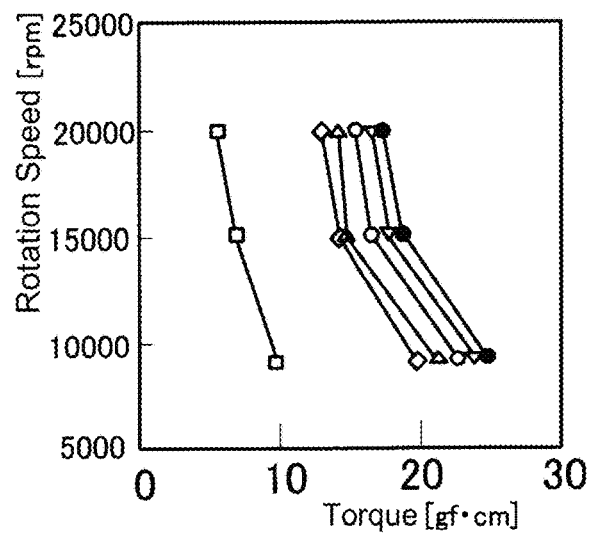
FIG. 8A-8C show simulation results.
Figure 8B:
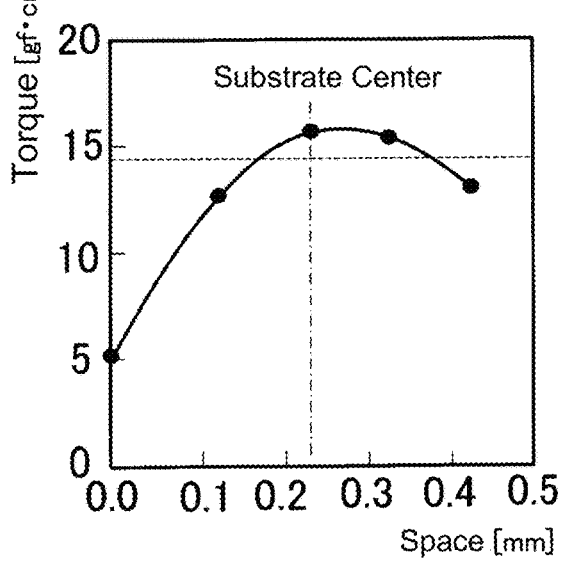
Figure 8C:
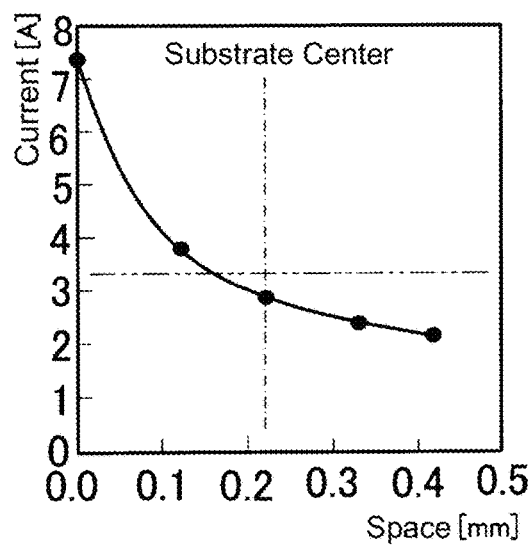
Figure 8D:
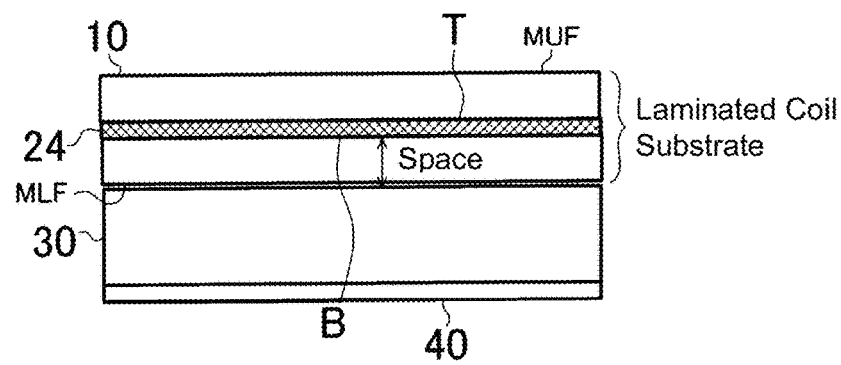
FIG. 8D illustrates a space between a magnetic sheet and a magnet.

FIG. 8D illustrates an example of a motor coil that includes the laminated coil substrate 10, the magnet 30 and the iron plate 40. A sheet indicated by a reference numeral 24 in FIG. 8D is the magnetic sheet 24. The laminated coil substrate 10 of FIG. 8D has a diameter of 9.4 mm and a thickness of 0.5 mm. The magnet 30 has a diameter of 9.4 mm and a thickness of 0.5 mm. The iron plate 40 has a diameter of 9.8 mm and a thickness of 0.2 mm. When the motor coil of FIG. 8D is used as a motor, the motor coil of FIG. 8D is accommodated in a housing (not illustrated in the drawings).

The number of coil substrates that form a laminated coil substrate 10 is preferably 8. The laminated coil substrates 10 of FIG. 7A-7F are each formed by eight coil substrates (D). In the laminated coil substrate 10 of FIG. 7B, a magnetic sheet 24 is position substantially at a center in a thickness direction of the laminated coil substrate 10. The magnetic sheet 24 is sandwiched between a coil substrate (D4) and a coil substrate (D5). Then, the number of the coil substrates formed above the magnetic sheet 24 is 4, and the number of the coil substrates formed below the magnetic sheet 24 is 4. In this way, the laminated coil substrate 10 preferably has the magnetic sheet 24 at substantially the center in the thickness direction. Then, the number of the coil substrates formed above the magnetic sheet 24 and the number of the coil substrates formed below the magnetic sheet 24 are preferably equal to each other. The number of the coil substrates that form the laminated coil substrate 10 is preferably an even number. The number of the magnetic sheets 24 in the laminated coil substrate 10 is preferably 1.

A thickness of the magnetic sheet 24 is substantially equal to a thickness of each of the adhesive layers 22. Or, the thickness of the magnetic sheet 24 is greater than the thickness of each of the adhesive layers 22. For example, the thickness of the magnetic sheet 24 and the thickness of each of the adhesive layers 22 are each 0.05 mm. The magnetic sheet 24 has a relative permeability of 500. A shape of each of the adhesive layers 22 and a shape of the magnetic sheet 24 are the same as a shape of each of the coil substrates.

Figure 7A:
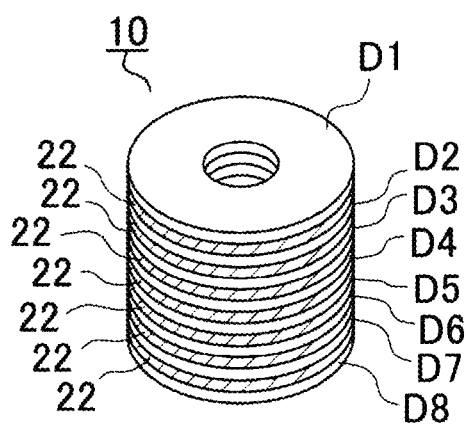
FIG. 7A-7F respectively illustrate examples of laminated coil substrates according to an embodiment of the present invention.

The laminated coil substrate 10 of FIG. 7A does not have a magnetic sheet (Reference Example 1).

Figure 7B:
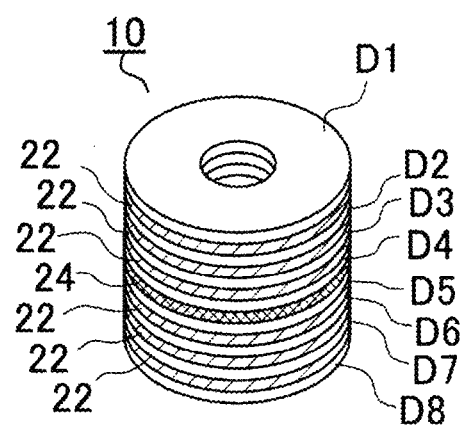

The laminated coil substrate 10 of FIG. 7B has a magnetic sheet 24 at substantially a center (substantially a center in a cross-sectional direction) of the laminated coil substrate 10 (Example 1). The magnetic sheet 24 illustrated in FIG. 7B is formed at, for example, the position 0.5.

Figure 7C:
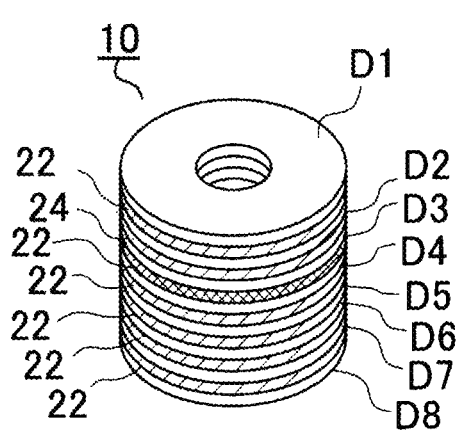

The laminated coil substrate 10 of FIG. 7C has a magnetic sheet 24 at an upper portion (upper portion in the cross-sectional direction) of the laminated coil substrate 10 (Example 2). The magnetic sheet 24 illustrated in FIG. 7C is formed at, for example, the position 0.7. In this example, the number of the coil substrates formed above the magnetic sheet 24 is 3, and the number of the coil substrates formed below the magnetic sheet 24 is 5. The magnetic sheet 24 is sandwiched between the coil substrate (D3) and the coil substrate (D4).

Figure 7D:
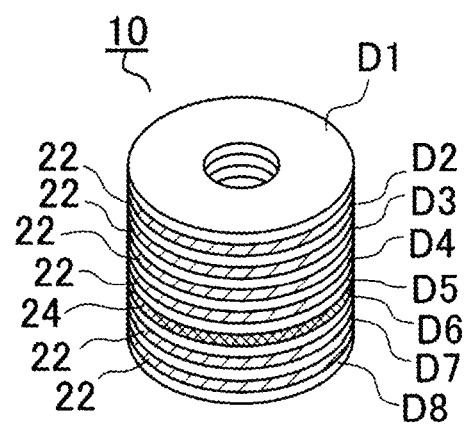

The laminated coil substrate 10 of FIG. 7D has a magnetic sheet 24 at a lower portion (lower portion in the cross-sectional direction) of the laminated coil substrate 10 (Example 3). The magnetic sheet 24 illustrated in FIG. 7D is formed at, for example, the position 0.3. In this example, the number of the coil substrates formed above the magnetic sheet 24 is 5, and the number of the coil substrates formed below the magnetic sheet 24 is 3. The magnetic sheet 24 is sandwiched between the coil substrate (D6) and the coil substrate (D5).

Figure 7E:
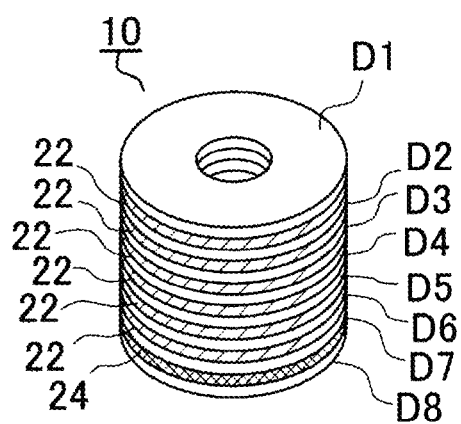

The laminated coil substrate 10 of FIG. 7E has a magnetic sheet 24 at a lowermost portion of the laminated coil substrate 10 (Reference Example 2). In this example, the magnetic sheet 24 is formed between the lowermost coil substrate (D8) and the coil substrate (D7) formed directly above the lowermost coil substrate. The magnetic sheet 24 illustrated in FIG. 7E is formed at, for example, the position 0.15.

In this example, the number of the coil substrates formed above the magnetic sheet 24 is 7, and the number of the coil substrates formed below the magnetic sheet 24 is 1.

Figure 7F:
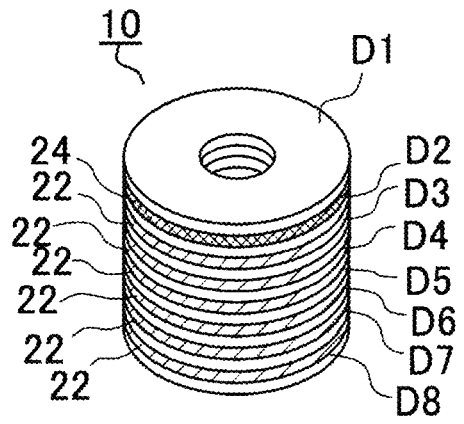

The laminated coil substrate 10 of FIG. 7F has a magnetic sheet 24 at an uppermost portion of the laminated coil substrate 10 (Reference Example 3). In this example, the magnetic sheet 24 is formed between the uppermost coil substrate (D1) and the coil substrate (D2) formed directly below the uppermost coil substrate. The magnetic sheet 24 illustrated in FIG. 7F is formed at, for example, the position 0.85. In this example, the number of the coil substrates formed above the magnetic sheet 24 is 1, and the number of the coil substrates formed below the magnetic sheet 24 is 7.

FIG. 8A shows relationships between the positions of the magnetic sheets illustrated in FIG. 7A-7F and characteristics of motor coils. These relationships are simulation results. In FIG. 8A, the vertical axis indicates rotation speeds [rpm], and the horizontal axis indicates torques (gf·cm). FIG. 8A shows relationships between the torque (gf·cm) and the rotation speed (rpm). In FIG. 8A, a higher torque value is preferable. The performance of the motor coil is increased. In FIG. 8A, the example of FIG. 7A (Reference Example 1) is indicated using rhombuses ◇. The example of FIG. 7B (Example 1) is indicated using black circles ●. The example of FIG. 7C (Example 2) is indicated using inverted triangles ∇. The example of FIG. 7D (Example 3) is indicated using open circles ○. The example of FIG. 7E (Reference Example 2) is indicated using squares □. The example of FIG. 7F (Reference Example 3) is indicated using triangles Δ.

From FIG. 8A, the performance is expected to improve in the examples in the order of Example 3, Example 2, and Example 1. The performance of Reference Example 1 and the performance of Reference Example 3 are expected to be about the same. The performance of Reference Example 2 is expected to be inferior to the performance of Reference Example 1. From the above, it is thought to be difficult to maximize the performance of the motor coil by merely forming a magnetic sheet in the laminated coil substrate. When the laminated coil substrate 10 has the magnetic sheet 24, the position of the magnetic sheet 24 formed in the laminated coil substrate 10 is thought to affect the performance of the motor coil.

In the cross-sectional direction of the laminated coil substrate, the position of the magnetic sheet 24 in the laminated coil substrate 10 is preferably positioned substantially at the center. Next, in the cross-sectional direction of the laminated coil substrate, the position of the magnetic sheet 24 in the laminated coil substrate 10 is preferably positioned at an upper portion. Next, in the cross-sectional direction of the laminated coil substrate, the position of the magnetic sheet 24 in the laminated coil substrate 10 is preferably positioned at a lower portion.

When the position of the magnetic sheet is substantially at the center, the magnetic sheet 24 is preferably positioned between the position 0.3 and the position 0.7. When the magnetic sheet 24 is formed between the position 0.4 and the position 0.6, the performance of the motor coil is stabilized. When the magnetic sheet 24 is formed at the position 0.5, the performance of the motor coil is high. And, the performance is stabilized.

When the position of the magnetic sheet is at an upper portion, the magnetic sheet 24 is approximately positioned between the position 0.5 and the position 0.7. The performance of the motor coil can be improved. The laminated coil substrate 10 having the magnetic sheet 24 formed at the position 0.7 is expected to meet requirements for a motor coil.

When the position of the magnetic sheet is at a lower portion, the magnetic sheet 24 is approximately positioned between the position 0.3 and the position 0.5. The performance of the motor coil can be improved. The laminated coil substrate 10 having the magnetic sheet 24 formed at the position 0.3 is expected to meet requirements for a motor coil.

According to Reference Example 1, Reference Example 2, and Reference Example 3, even when a laminated coil substrate 10 has a magnetic sheet 24, the performance of the laminated coil substrate 10 that has the magnetic sheet 24 does not necessarily exceed the performance of a laminated coil substrate that does not have a magnetic sheet 24. For example, for the positions of the magnetic sheet illustrated in Reference Example 2 and Reference Example 3, it is thought to be difficult to generate a strong magnetic field even when the laminated coil substrate 10 has a magnetic sheet.

FIG. 8D illustrates a motor coil formed by the laminated coil substrate 10 and the magnet 30. Further, FIG. 8D illustrates a distance (space) between the magnetic sheet (magnetic layer) 24 in the laminated coil substrate 10 and the magnet 30. FIG. 8B shows a relationship between the torque and the space illustrated in FIG. 8D. When the rotation speed is 15000 rpm, the relationship shown in FIG. 8B is obtained. In FIG. 8B, the vertical axis indicates the torque (gf·cm) and the horizontal axis indicates the space (mm). FIG. 8C shows a relationship between the current and the space illustrated in FIG. 8D. When the torque is 15 gf·cm, the relationship shown in FIG. 8C is obtained. In FIG. 8C, the vertical axis indicates the current (A) and the horizontal axis indicates the space (mm). When the value of the space in FIGS. 8B and 8C is 0.22 mm or less, the magnetic sheet (magnetic layer) is formed at the center or the lower portion of the laminated coil substrate 10. When the value of the space in FIGS. 8B and 8C exceeds 0.22 mm, the magnetic sheet (magnetic layer) is formed at the upper portion of the laminated coil substrate 10.

From FIG. 8B, it is expected that the torque value can be maximized by forming the magnetic sheet 24 at the position 0.5.

From the simulation results, the magnetic sheet 24 is desirably formed between the position 0.3 and the position 0.7. Next, the magnetic sheet 24 is desirably formed between the position 0.4 and the position 0.7. Next, the magnetic sheet 24 is desirably formed between the position 0.4 and the position 0.6. Next, the magnetic sheet 24 is desirably formed between the position 0.5 and the position 0.7. In particular, the magnetic sheet 24 is desirably formed at the position 0.5. As illustrated in FIG. 8D, the magnetic sheet 24 has a top surface (T) and a bottom surface (B) that is on an opposite side with respect to the top surface (T). The top surface (T) opposes the uppermost surface (MUF) of the laminated coil substrate 10, and the bottom surface (B) opposes the lowermost surface (MLF) of the laminated coil substrate 10. it is preferable that the magnetic sheet 24 be formed at the position 0.5 and a distance between the center plane (CCF) and the bottom surface (B) be smaller than a distance between the center plane (CCF) and the top surface (T).

FIG. 7A-7F are each a schematic diagram illustrating the position of the magnetic sheet 24 in the laminated coil substrate 10 according to the embodiment.

Figure 5B:
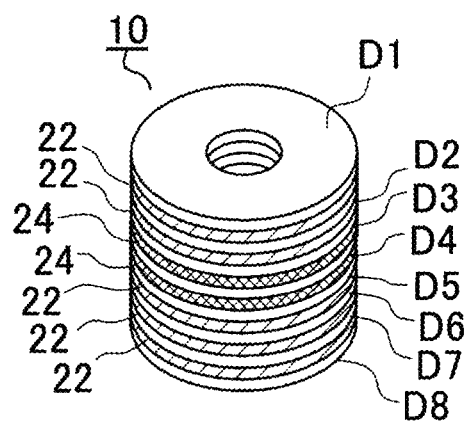
FIGS. 5B and 5C respectively illustrate examples of laminated coil substrates.
Figure 5C:
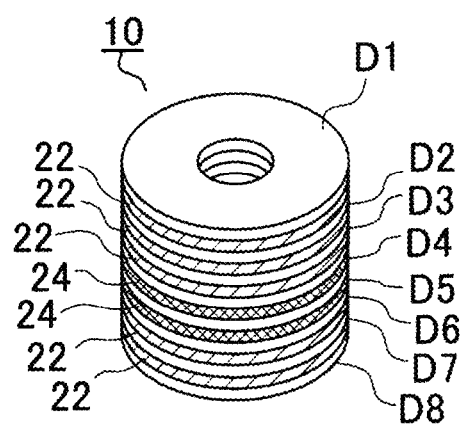

The laminated coil substrate 10 includes the first coil substrate (D1), the second coil substrate (D2), the third coil substrate (D3), the fourth coil substrate (D4), the fifth coil substrate (D5), the sixth coil substrate (D6), the seventh coil substrate (D7) and the eighth coil substrate (D8). These coil substrates (the first coil substrate (D1), the second coil substrate (D2), the third coil substrate (D3), the fourth coil substrate (D4), the fifth coil substrate (D5), the sixth coil substrate (D6), the seventh coil substrate (D7) and the eighth coil substrate (D8)) are connected. Further, the laminated coil substrate 10 has the adhesive layers 22 between adjacent coil substrates. In the example of FIG. 7B, the magnetic sheet 24 is formed between the fourth coil substrate (D4) and the fifth coil substrate (D5) near the center (the center in the cross-sectional direction) of the laminated coil substrate. In the example of FIG. 7C, the magnetic sheet 24 is formed between the third coil substrate (D3) and the fourth coil substrate (D4) positioned at an upper portion of the laminated coil substrate. In the example of FIG. 7D, the magnetic sheet 24 is formed between the fifth coil substrate (D5) and the sixth coil substrate (D6) positioned at a lower portion of the laminated coil substrate. The example of FIG. 5B is a combination of the example of FIG. 7B and the example of FIG. 7C. The example of FIG. 5C is a combination of the example of FIG. 7B and the example of FIG. 7D. In these examples, the laminated coil substrate 10 has multiple magnetic sheets 24. When the laminated coil substrate 10 has multiple magnetic sheets 24, the laminated coil substrate 10 preferably has a magnetic sheet 24 positioned substantially at the center and a magnetic sheet 24 positioned at an upper portion. For example, one magnetic sheet 24 is formed at the position 0.5, and the other magnetic sheet 24 is positioned between the magnetic sheet 24 formed at the position 0.5 and the uppermost surface (MUF) of the laminated coil substrate 10. For example, the laminated coil substrate 10 has a magnetic sheet 24 formed at the position 0.5 and a magnetic sheet 24 formed at the position 0.7. By forming a magnetic sheet 24 between the position 0.5 and the position 0.7, characteristics of a motor can be improved.

The printed wiring board 100 forming the laminated coil substrate 10 has the coils (C) and the through-hole conductors (T) and the connection wires (i) connecting between the coils (C). As conductors that each connect between two coils (C), the through-hole conductors (T) and the connection wires (i) are alternately formed.

An example of a relationship between a winding direction of a coil and a flow direction of a current flowing through the coil is described as follows.

The directions of currents flowing through the coils (C) and the winding directions of the coils (C) are related. When a winding direction of a coil is clockwise, a current flows clockwise through the coil. When a winding direction of a coil is counterclockwise, a current flows counterclockwise through the coil.

The opening (O1) is formed at the central area of the first coil substrate (D1). The opening (O2) is formed at the central area of the second coil substrate (D2). The opening (O3) is formed at the central area of the third coil substrate (D3). The opening (O4) is formed at the central area of the fourth coil substrate (D4). A shaft of a fan motor is inserted into the openings (O1, O2, O3, O4).

Japanese Patent Laid-Open Publication No. 2001-135548 describes a laminated inductance formed by alternately laminated insulating layers and conductor patterns. Adjacent conductor patterns are connected to each other by conductor projections penetrating the insulating layers. According to FIG. 1 of Japanese Patent Laid-Open Publication No. 2001-135548, a sheet is prepared having an insulating layer, a conductor pattern formed on the insulating layer, and a conductor projection formed on the conductor pattern. Then, by laminating multiple sheets, a laminated inductance is manufactured. In Japanese Patent Laid-Open Publication No. 2001-135548, adjacent conductor patterns are connected to each other via the conductor projections. When the number of the sheets is increased, it is difficult to maintain reliability of the connection via the conductor projections. In Japanese Patent Laid-Open Publication No. 2001-135548, it is difficult to provide a laminated inductance having a high inductance.

A motor coil according to an embodiment of the present invention includes a laminated coil substrate and a magnet, the laminated coil substrate being obtained by alternately laminating coil substrates and adhesive layers, and the magnet being formed below the laminated coil substrate. The coil substrates are obtained by folding a printed wiring board that includes: a resin substrate having a first surface and a second surface that is on an opposite side with respect to the first surface, a first conductor layer that is formed on the first surface and forms coils, and a second conductor layer that is formed on the second surface and forms coils. One of the adhesive layers is formed of a magnetic sheet.

According to an embodiment of the present invention, the laminated coil substrate has a magnetic sheet. For example, the magnetic sheet is formed at substantially a center in a thickness direction of the laminated coil substrate. Therefore, it is thought that magnetic flux can efficiently pass through the magnet. Or, it is thought that magnetic flux enters the magnet. Performance of a motor can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A motor coil, comprising:
a magnet structure; and
a laminated coil substrate formed on the magnet structure and comprising a plurality of coil substrates and a plurality of adhesive layers alternately laminated, wherein the coil substrates is formed by folding a printed wiring board comprising a resin substrate, a first conductor layer formed on a first surface of the resin substrate and forming a plurality of coils, and a second conductor layer formed on a second surface on an opposite side with respect to the first surface and forming a plurality of coils, and the plurality of adhesive layers includes an adhesive layer comprising a magnetic sheet.

2. The motor coil according to claim 1, wherein the plurality of adhesive layers is formed such that the adhesive layer comprising the magnetic sheet is positioned substantially at a center in a thickness direction of the laminated coil substrate.

3. The motor coil according to claim 2, wherein the laminated coil substrate has a lowermost surface opposing the magnet structure, an uppermost surface on an opposite side with respect to the lowermost surface, and a center plane positioned equidistant from the lowermost surface and the uppermost surface such that when a position in a thickness direction of the laminated coil substrate is digitized using a numerical value between 0 and 1, a position of the lowermost surface is represented by 0, a position of the center plane is represented by 0.5, a position of the uppermost surface is represented by 1, and a position of the magnetic sheet in the adhesive layer is between 0.3 and 0.7.

4. The motor coil according to claim 3, wherein the position of the magnetic sheet in the adhesive layer is between 0.4 and 0.6.

5. The motor coil according to claim 3, wherein the position of the magnetic sheet in the adhesive layer is between 0.4 and 0.7.

6. The motor coil according to claim 3, wherein the position of the magnetic sheet in the adhesive layer is between 0.5 and 0.7.

7. The motor coil according to claim 1, wherein the plurality of adhesive layers is consisting of the magnetic sheet in the adhesive layer.

8. The motor coil according to claim 1, wherein the laminated coil substrate is formed such that the plurality of coil substrates is an even number of coil substrates.

9. The motor coil according to claim 1, wherein the plurality of coil substrates includes a first coil substrate and a second coil substrate, the first coil substrate has the first surface and the second surface, the second coil substrate has the first surface and the second surface, the first coil substrate has a fourth coil formed on the first surface and a fifth coil formed on the second surface, the second coil substrate has a seventh coil formed on the first surface and a sixth coil formed on the second surface, the fourth coil and the fifth coil are symmetrically formed with respect to the resin substrate that forms the first coil substrate, the sixth coil and the seventh coil are symmetrically formed with respect to the resin substrate that forms the second coil substrate, and the printed wiring board is folded such that the fifth coil and the sixth coil oppose each other.

10. The motor coil according to claim 9, wherein the first coil substrate has a third through-hole conductor penetrating through the resin substrate and connecting the fourth coil and the fifth coil, the second coil substrate has a fourth through-hole conductor connecting the sixth coil and the seventh coil, and the printed wiring board has on the second surface a third connection wire connecting the fifth coil and the sixth coil.

11. The motor coil according to claim 10, wherein the third connection wire is formed on the second surface of the first coil substrate and the second surface of the second coil substrate, and the third connection wire extends from the first coil substrate to the second coil substrate.

12. The motor coil according to claim 9, wherein the plurality of coil substrates further includes a third coil substrate, the third coil substrate has the first surface and the second surface, the second coil substrate further has a tenth coil formed on the second surface and an eleventh coil formed on the first surface, the tenth coil and the eleventh coil are symmetrically formed with respect to the resin substrate that forms the second coil substrate, the third coil substrate has a twelfth coil formed on the first surface and a thirteenth coil formed on the second surface, the twelfth coil and the thirteenth coil are symmetrically formed with respect to the resin substrate that forms the third coil substrate, and the printed wiring board is folded such that the eleventh coil and the twelfth coil oppose each other.

13. The motor coil according to claim 12, wherein the second coil substrate has a sixth through-hole conductor penetrating through the resin substrate and connecting the tenth coil and the eleventh coil, the third coil substrate has a seventh through-hole conductor connecting the twelfth coil and the thirteenth coil, and the printed wiring board has on the first surface a sixth connection wire connecting the eleventh coil and the twelfth coil.

14. The motor coil according to claim 1, wherein the first conductor layer and the second conductor layer have a plurality of connection wires connecting between the coils, and the printed wiring board has a plurality of through-hole conductors connecting between the coils in the first conductor layer and the coils in the second conductor layer such that winding directions of the coils in the first conductor layer and the coils in the second conductor layer that are directly connected to each other by the through-hole conductors are same as each other, and that winding directions of the coils that are directly connected to each other by the connection wires are different from each other.

15. The motor coil according to claim 1, wherein each of the coil substrates has a plurality of coils on the first surface and the second surface such that the plurality of coils has an even number of coils formed on the first surface, and an even number of coils formed on the second surface.

16. The motor coil according to claim 9, wherein when the fourth coil is moved in a parallel direction, the fourth coil overlaps the fifth coil, and when the sixth coil is moved in a parallel direction, the sixth coil overlaps the seventh coil.

17. The motor coil according to claim 9, wherein the laminated coil substrate is formed such that directions of currents flowing through the coils that are symmetrically formed are same as each other.

18. The motor coil according to claim 1, wherein the printed wiring board has a plurality of connection wires connecting between adjacent coil substrates such that the adjacent coil substrates are connected to each other only by the connection wires.

19. The motor coil according to claim 1, wherein the magnet structure comprises a plurality of magnets and having a surface facing the laminated coil substrate such that the surface of the magnet structure has a plurality of N poles and a plurality of S poles alternately positioned.

20. The motor coil according to claim 1, wherein the plurality of adhesive layers comprises epoxy material, and the adhesive layer comprising the magnetic sheet comprises the epoxy material and magnetic particles mixed in the epoxy material.

* * * * *